US011353577B2

(12) United States Patent
Liu et al.

(10) Patent No.: US 11,353,577 B2
(45) Date of Patent: Jun. 7, 2022

(54) RADAR SPATIAL ESTIMATION

(71) Applicant: Zoox, Inc., Foster City, CA (US)

(72) Inventors: Yu Liu, Newark, CA (US); Chuang Wang, Sunnyvale, CA (US); Joshua Kriser Cohen, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 281 days.

(21) Appl. No.: 16/147,177

(22) Filed: Sep. 28, 2018

(65) Prior Publication Data

US 2020/0103523 A1 Apr. 2, 2020

(51) Int. Cl.
*G01S 13/931* (2020.01)
*G01S 13/72* (2006.01)
*G01S 13/86* (2006.01)

(52) U.S. Cl.
CPC .......... *G01S 13/931* (2013.01); *G01S 13/723* (2013.01); *G01S 13/865* (2013.01); *G01S 13/867* (2013.01)

(58) Field of Classification Search
CPC ............. G05D 1/0088; G05D 2201/02; G05D 1/0257; G05D 1/0274; G05D 2201/0213; G05D 1/0276; G05D 2201/0207; G01S 13/931; G01S 13/89; G01S 17/931; G01S 13/867; G01S 17/89; G01S 13/723; G01S 7/4808; G01S 17/42; G01S 13/865; G01S 17/04; G01S 17/86; G08G 1/166; G08G 1/0133; G06K 9/00805; G06K 9/00664; G06K 9/00201; G06K 9/00791; B60W 40/06; B60W 2050/0095; B60W 2420/52; B60W 2556/50; B60W 2554/20;
(Continued)

(56) References Cited

U.S. PATENT DOCUMENTS 6,055,042 A 4/2000 Sarangapani
6,173,215 B1 1/2001 Sarangapani
(Continued)

FOREIGN PATENT DOCUMENTS

EP 3229041 10/2017
WO WO2013162559 A1 10/2013

OTHER PUBLICATIONS

U.S. Appl. No. 16/011,468, filed Jun. 18, 2018, Silva et al., "Occulsion Aware Planning and Control," 67 pages.
(Continued)

*Primary Examiner* — Olumide Ajibade Akonai
(74) *Attorney, Agent, or Firm* — Lee & Hayes, P.C.

(57) ABSTRACT

Techniques are discussed for generating a spatial grid based on radar sensor data. The spatial grid may include cells, which may be designated as being occupied, occluded, and/or free space. A cell may be designated as being occupied if radar sensor data is associated with a region of an environment associated with the cell. A field may be designated as being occluded if a region of the environment associated with the cell is obstructed, relative to a radar sensor, by a cell that is designated as being occupied. In some instances, objects may be detected and/or tracked in occluded regions. A cell may be designated as being free space if a region associated with the cell is within a field of view of a radar sensor and is unoccupied and un-occluded. In some instances, the spatial grid may be used to control a vehicle, such as an autonomous vehicle, in the environment.

20 Claims, 9 Drawing Sheets

(58) Field of Classification Search
CPC ......... B60W 2554/4048; H04W 4/029; H04W 4/024; G06T 2207/30241; G06T 2207/30261

See application file for complete search history.

(56) References Cited

U.S. PATENT DOCUMENTS

| | | | |
|---|---|---|---|
| 7,266,477 B2* | 9/2007 | Foessel | G01S 13/723 |
| | | | 340/436 |
| 9,315,192 B1 | 4/2016 | Zhu et al. | |
| 9,612,123 B1 | 4/2017 | Levinson et al. | |
| 10,037,613 B1 | 7/2018 | Becker et al. | |
| 10,086,809 B1* | 10/2018 | Prasad | B60T 7/22 |
| 10,145,951 B2* | 12/2018 | Izzat | G06K 9/3233 |
| 10,268,191 B1 | 4/2019 | Lockwood et al. | |
| 10,296,794 B2 | 5/2019 | Ratti | |
| 10,491,885 B1* | 11/2019 | Hicks | H04N 13/275 |
| 10,678,246 B1* | 6/2020 | Warshauer-Baker | |
| | | | G05D 1/0257 |
| 2014/0214255 A1* | 7/2014 | Dolgov | G05D 1/0248 |
| | | | 701/23 |
| 2015/0057907 A1 | 2/2015 | Rebhan | |
| 2016/0129917 A1 | 5/2016 | Gariepy et al. | |
| 2016/0180177 A1* | 6/2016 | Nguyen | G06K 9/00798 |
| | | | 382/104 |
| 2017/0256071 A1* | 9/2017 | Laugier | B60W 40/04 |
| 2017/0329008 A1* | 11/2017 | Walessa | G01S 17/86 |
| 2017/0369051 A1 | 12/2017 | Sakai et al. | |
| 2017/0371338 A1* | 12/2017 | Kamata | G01S 17/93 |
| 2018/0113209 A1* | 4/2018 | Campbell | G05D 1/0257 |
| 2019/0064840 A1* | 2/2019 | Becker | G05D 1/0248 |
| 2019/0065864 A1 | 2/2019 | Yu et al. | |
| 2019/0087667 A1* | 3/2019 | Foroughi | G01S 5/0294 |
| 2019/0138823 A1* | 5/2019 | Doria | G06T 7/521 |
| 2019/0212746 A1 | 7/2019 | Cheng et al. | |
| 2019/0272433 A1 | 9/2019 | Yu et al. | |
| 2019/0384302 A1 | 12/2019 | Silva et al. | |
| 2019/0384309 A1 | 12/2019 | Silva et al. | |
| 2019/0387185 A1* | 12/2019 | Hicks | H04N 5/33 |
| 2020/0033140 A1* | 1/2020 | Gautam | G01S 17/931 |
| 2020/0049511 A1* | 2/2020 | Sithiravel | B60W 10/20 |
| 2020/0225672 A1 | 7/2020 | Silva et al. | |

OTHER PUBLICATIONS

Isele et al, "Navigating Occluded Intersections with Autonomous Vehicles using Deep Reinforcement Learning," 2018 IEEE International Conference on Robotice and Austomation (ICRA), IEEE, May 21, 2018, pp. 2034-2039.

The PCT Search Report and Written Opinion dated Sep. 19, 2019 for PCT Application No. PCT/US2019/037514, 14 pages.

Seo et al, "A Perception Mechanism for Supporting Autonomous Intersection Handling in Urban Driving," Intelligent Robots and Systems 2008, IROS 2008, IEEE/RSJ International Conference on, IEEE, Piscataway, NJ, USA, Sep. 22, 2008, pp. 1830-1835.

The PCT Search Report and Written Opinion dated Jan. 16, 2020 for PCT Application No. PCT/US2019/053013, 9 pages.

Office Action for U.S. Appl. No. 16/011,436, dated Mar. 4, 2020, Silva, "Occlusion Aware Planning", 11 pages.

U.S. Office Action dated Oct. 14, 2020 for U.S. Appl. No. 16/011,436, "Occlusion Aware Planning", Silva, 9 pages.

Office Action for U.S. Appl. No. 16/831,581, dated Oct. 15, 2021, Silva, "Occulsion Aware Planning and Control", 6 Pages.

* cited by examiner

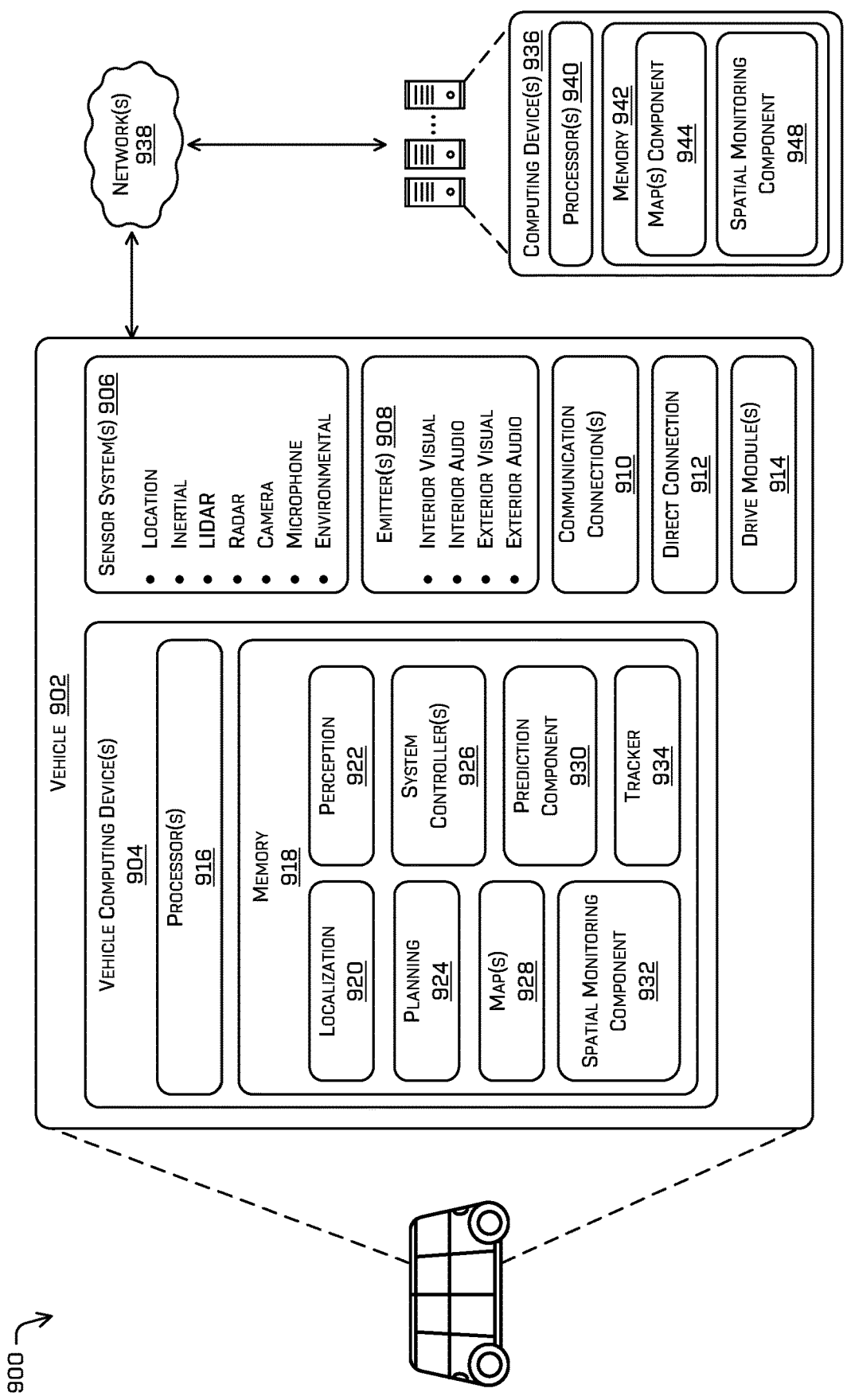

RADAR SPATIAL ESTIMATION

BACKGROUND

Various methods, apparatuses, and systems are utilized by autonomous vehicles to guide such autonomous vehicles through environments including obstacles. For instance, autonomous vehicles utilize route planning methods, apparatuses, and systems to navigate through areas that may include other vehicles, buildings, pedestrians, or other objects. In some examples, the vehicles, buildings, and/or objects in an environment can block areas of the environment from being visible to sensors of the autonomous vehicle, which can present challenges in safely traversing through such areas.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 is a schematic block diagram of an example system including a vehicle and a computing device usable to implement the radar spatial grid estimation techniques described herein, in accordance with embodiments of the disclosure.

DETAILED DESCRIPTION

Figure 1:
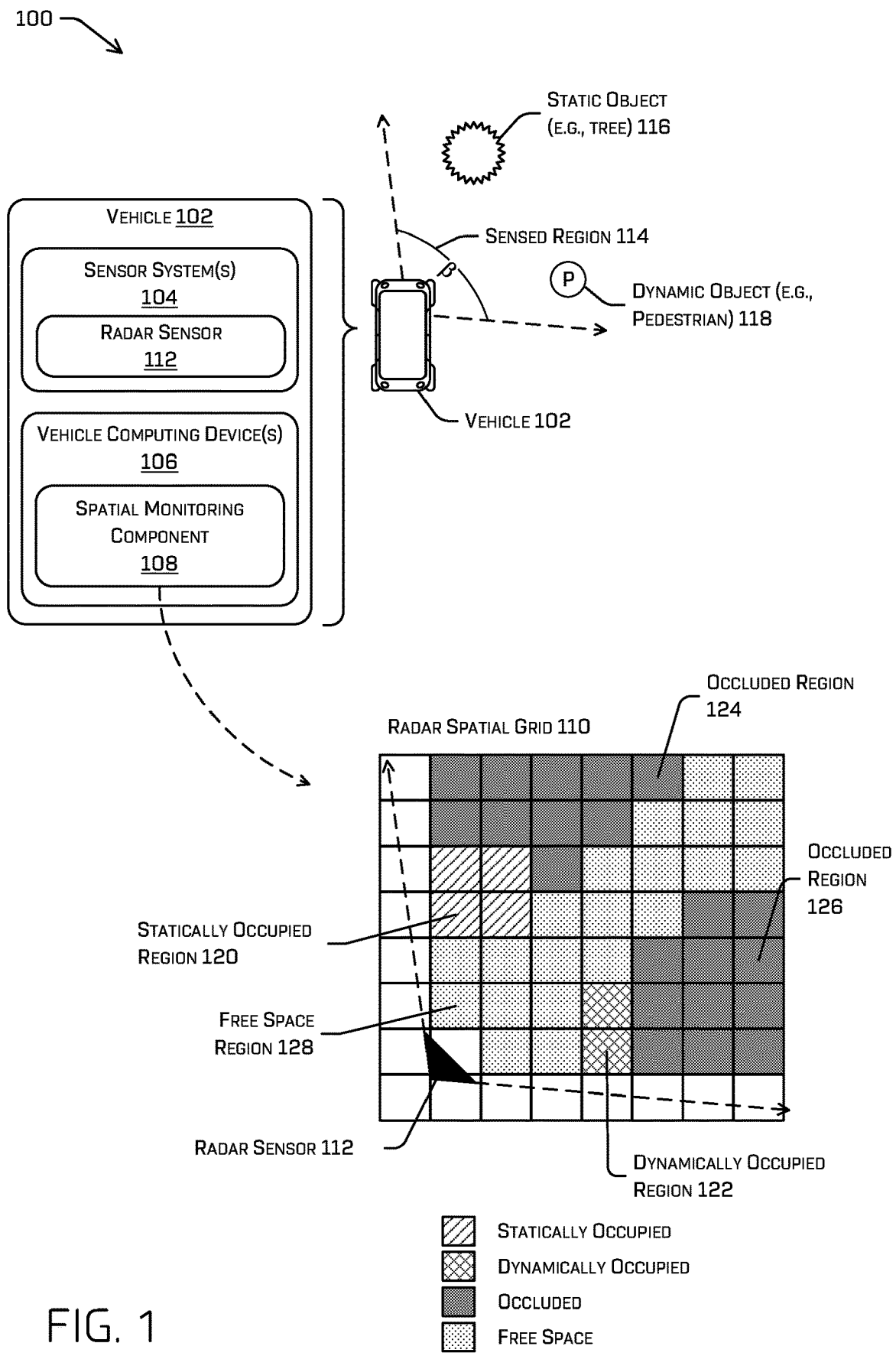
FIG. 1 is a schematic view illustrating an example environment in which a vehicle is operating, the vehicle including a radar spatial grid having cells associated with regions of the environment, individual cells of the radar spatial grid being designated as occupied, occluded, or free space, in accordance with embodiments of the disclosure.

As discussed above, vehicles, buildings, vegetation and other objects in an environment can block or occlude areas of the environment from being visible to sensors of an autonomous vehicle traversing the environment. Such occluded areas can present challenges to the autonomous vehicle safely traversing through the environment.

This application describes techniques for estimating spatial information (e.g., occupancy, occlusion, and/or free space) in an environment based at least in part on radar sensor data captured by a radar system. The radar sensor data may be used to generate and maintain a radar spatial grid that represents the environment as captured by the radar system. The radar spatial grid includes multiple cells, each of which is associated with a discrete portion of the environment. Individual cells of the radar spatial grid may be designated to indicate whether the respective cell is occupied (e.g., by a static or dynamic object), is occluded (e.g., blocked by an object), and/or represents free space. In some instances, one or more cells of the spatial grid may be designated with multiple occupancy status indicators (e.g., a cell may be designated as both occupied and occluded). In some examples, occupancy status of each cell may be represented by one or more probabilities. For instance, each cell in the spatial grid may have a first probability of being occupied, a second probability of being occluded, and/or a third probability of being free space. In some examples, a first spatial grid may include multiple cells designated with a probability that each cell is occupied, a second spatial grid may include multiple cells designated with a probability that each cell is occluded, and/or a third spatial grid may include multiple cells designated with a probability that each cell is free space. In some examples, cells of an occupancy grid may be determined to be occupied, occluded, and/or free space based upon the probabilities associated with the respective cells of the spatial grid. For instance, if a cell has a probability that a cell is occupied is higher than a probability that the cell is occluded, the cell may be designated as being occupied, and vice versa. In some instances, such as when insufficient radar returns are received for a region or where a region falls outside a field of view of the radar sensors, a cell associated with the region may be designated as being indeterminate or the cell may not include a designation.

Occupied: Cells of the radar spatial grid may be designated as being occupied by mapping radar sensor data (e.g., radar returns) of the environment to corresponding cells of the radar spatial grid. In some examples, the radar spatial grid may indicate, for occupied cells, whether the cell is occupied by a static object (e.g., a building, parked vehicle, vegetation, etc.) or a dynamic object (e.g., vehicle, bicycle, pedestrian, etc.). In the case of a static radar object static radar return having zero velocity is received. A first cell of the radar spatial grid associated with the location of the radar return is designated as being occupied. Occupancy probabilities can be computed for cells adjacent to the first cell based on the static radar return and historical returns. Each adjacent cell having an occupancy probability above a threshold probability can be designated as being occupied. The threshold probability may be predetermined or may be dependent on one or more operating conditions (e.g., speed of the vehicle, sparseness of radar returns, etc.). In the case of a dynamic object, a radar track having a location and a velocity can be received and provided to a tracker of a vehicle computing device. The tracker outputs a bounding box representing a size, shape, and/or pose of the tracked dynamic object. The tracker may additionally or alternatively output a trajectory or vector representing a current direction of travel of the dynamic object. One or more cells of the radar spatial grid associated with a region occupied by the bounding box are designated as being occupied by the dynamic object (e.g., dynamically occupied).

In some examples, after detecting a first object (e.g., a static object) and designating a first cell of the radar spatial grid associated with a first region occupied by the first object as being occupied, a second object may be detected entering the first region associated with the first object. Based on detecting the second object entering the first region, the vehicle computing device may determine that the first region is not occupied (e.g., is unoccupied). In some examples, various radar sensors may not be able to differentiate height (e.g. they only provide two-dimensional information) and, as such, may receive returns from a region (e.g., an overpass, a bridge, etc.), despite the region having a driveable surface or otherwise being navigable. In a particular example, the first object may be at a different elevation than the vehicle and the second object, thus the region may appear based on the radar returns to be occupied by a static object (e.g., an overpass) when in fact the region at the elevation of the vehicle and second object is not occupied. In that case, the radar spatial grid may be updated to indicate that the first cell is unoccupied.

Occluded: Cells of the radar spatial grid may be designated as being occluded based at least in part on a location of an occupied cell (e.g., the first cell) relative to a location of the radar sensor. For instance, occluded cells can be computed for each occupied cell by ray casting rays from a center of the radar sensor (or other location) through points at edges/extents of the respective occupied cell. An area bounded by the portions of the rays extending beyond the occupied cell constitute the occluded region. Cells of the radar spatial grid falling within this occluded region (or having a majority of their area falling within the occluded region) can be designated as being occluded. As used herein, a region of an environment is said to be occluded if it is at least partially blocked by an object in the environment. In the context of a radar sensor, a region may be occluded by an object if the object is interposed between the radar sensor and the region such that it substantially blocks the radio waves emitted from the radar sensor and prevents or impedes them from directly reaching the region. However, due to multi-path and multi-bounce returns, for example, a radar sensor may still receive returns that correspond to objects that are located in occluded regions. For the purposes of this application, a region is still said to be occluded despite the fact that a radar sensor may be able to detect the object based on multi-path, multi-bounce, or other non-direct returns.

Free space: Cells of the radar spatial grid may be designated as representing free space when they are within a field of view of the radar sensor and are neither occupied nor occluded.

In some examples, the radar spatial grid may be output for use by a vehicle computing device of an autonomous vehicle to control the autonomous vehicle to safely traverse the environment. The radar spatial grid may be updated as the vehicle traverses the environment, as additional radar data is acquired, and as dynamic objects in the environment move relative to the vehicle. The radar spatial grid may be used by the vehicle computing device to more quickly and accurately plan a trajectory for the autonomous vehicle through the environment. For example, the vehicle computing device may plan a trajectory to pass through regions of the environment that correspond to free space cells of the radar spatial grid and/or to avoid regions of the environment that correspond to occupied cells of the radar spatial grid. As another example, the vehicle computing device may plan a trajectory to approach regions of the environment that correspond to occluded cells of the radar spatial grid more slowly than the vehicle would otherwise approach free space cells. In some examples, the radar spatial grid may designate each cell as occupied, occluded, and/or free space, which may reduce or bound a range of potential trajectories for the vehicle, thereby reducing processing time and resources used by a planning system of the vehicle computing device to plan a trajectory for the vehicle. In other examples, the radar spatial grid may designate one or more cells of the radar spatial grid as being indeterminate (e.g., there is not enough information to determine the occupancy state of the cell).

In some examples, the radar system comprises multiple radar sensors, including at least a first radar sensor and a second radar sensor. In such examples, radar sensor data from the multiple radar sensors may be used to generate a composite or fused radar spatial grid, in which occupancy status of at least some cells in the fused radar spatial grid is based on sensor data from multiple radar sensors. The multiple radar sensors may be located at different locations (e.g., at different locations on a vehicle) and/or may have different or overlapping fields of view. Fusing radar sensor data from multiple radar sensors may increase a number of radar returns in portions of the environment at which the fields of view of the radar sensors overlap, may increase confidence values associated with radar returns, may reduce occluded regions of the radar spatial grid, and/or may be used to sense larger regions of the environment surrounding the vehicle. Radar sensor data from multiple radar sensors can be fused in a variety of ways. In one specific example, a radar spatial grid corresponding to a first radar sensor may be fused with a radar spatial grid of a second radar sensor by designating the union of the occupied cells of both spatial grids as being occupied, and designating the intersection of the occluded cells of both spatial grids as being occluded. In other words, a cell of the fused radar spatial grid can be designated as being occupied when radar sensor data of the first radar sensor, the second radar sensor, or both the first and second radar sensor, indicate that the region corresponding to the cell of the spatial grid is occupied. Whereas, a cell of the fused radar spatial grid can be designated as being occluded when radar sensor data of both the first radar sensor and the second radar sensor indicate that the region corresponding to the cell of the spatial grid is occluded. In other words, if at least one radar sensor determines a particular cell to is not occluded, the cell is indicated as being not occluded (i.e., occupied or free). By fusing radar sensor data of different radar sensors having different locations and/or fields of view, the fused radar spatial grid may have fewer occluded cells than radar spatial grids of either of the radar sensors individually. Cells of the fused radar spatial grid may be designated as being free space based at least in part on the radar sensor data of the first radar sensor and the second radar sensor. In one specific example, a cell of the fused radar spatial grid may be designated as free space if it is neither designated as being occupied nor occluded (e.g., it is unoccupied and un-occluded).

In addition to or instead of fusing radar spatial grids of multiple radar sensors, a radar spatial grid generated based on sensor data from one or more radar sensors may be combined or fused with a spatial grid based on one or more other sensor modalities (e.g., lidar sensors, image sensors, sonar sensors, etc.). In some examples, the radar spatial grid may be fused or otherwise combined with at least one of a lidar spatial grid or a camera spatial grid. Additional details of spatial grids (sometimes referred to as "occlusion grids")

using other sensor modalities can be found in, for example, U.S. patent application Ser. No. 16/011,468, filed Jun. 18, 2018, and titled "Occlusion Aware Planning and Control," which is incorporated herein by reference.

In some instances, using multiple sensor modalities (e.g., radar sensors, lidar sensors, image sensors, etc.) can improve an overall confidence level associated with an occupancy state, occlusion state, and/or free space state of one or more cells of a multi-modality fused spatial grid. In some instances, multiple spatial grids can be generated in parallel (e.g., substantially simultaneously) and the outputs of each can be combined and/or compared to increase an overall confidence level about the states of one or more cells in a composite or fused spatial grid. In some instances, one modality of data (e.g., time of flight data) can be used to determine states of occupancy of cells that are within a threshold distance to the vehicle, while another modality of data (e.g., radar and/or lidar) can be used to determine states of occlusion fields that meet or exceed a threshold distance from the vehicle. Of course, the examples described herein are not intended to be limiting, and other implementations are considered within the scope of the disclosure.

In some examples, radar spatial grid data may additionally or alternatively be associated with and/or stored in connection with map data representing the environment. The map data may be semantically labeled to indicate categories of objects in the environment (e.g., drivable surfaces, buildings, vegetation, etc.). The map data may supplement and provide context for the radar spatial grid or vice versa. For instance, if the map data indicates that there is an intersection or cross street in an occluded region, a planning system of the vehicle may determine to approach the occluded region more slowly, whereas if the map data shows that there is another building directly behind the occluded region then there may be no need for the planning system to slow the vehicle when approaching the occluded region.

A size of the radar spatial grid and/or the number of cells in the grid and their respective sizes to be generated and/or stored can be based at least in part on one or more region characteristics. In the context of an intersection, the region characteristics can include, but are not limited to, sparseness of radar returns; a distance across the intersection that the autonomous vehicle must travel (e.g., in order to be clear of oncoming traffic); a speed limit of vehicles in the intersection (e.g., of oncoming traffic); a safety factor associated with the speed limit (e.g., to effectively increase the speed of traffic to be expected); an acceleration level and/or average velocity of the autonomous vehicle traversing the intersection distance; and the like. These are but a few examples and other region characteristics are contemplated. Thus, the radar spatial grid can be sized such that the autonomous vehicle can safely traverse a region when the radar spatial grid is clear of obstacles.

In some examples, radar sensor data may be used to track objects in occluded regions. For instance, an object located in a first region may block or occlude a second region of the environment. By making use of multi-bounce and/or multi-path returns, radar sensor data may be used to detect occluded objects located in the second (occluded) region of the environment, which are not detectable by other sensors of the vehicle (e.g., lidar sensors, image sensors, etc.). One or more cells of the radar spatial grid corresponding to a region occupied by an occluded object may be designated as being occupied. In some examples, such cells corresponding to a region occupied by an occluded object may be designated as being occupied by an occluded object. In at least some examples, such a cell may be independently designated as "occluded" and "occupied." The radar spatial grid (or the raw radar sensor data corresponding to the occluded object) may be output to a tracker of the vehicle computing device and used to track the occluded object in the second (occluded) region. Tracking occluded objects may allow a planning system of an autonomous vehicle to make faster and/or more accurate planning decisions based on the location and trajectory of the occluded object. Additionally, tracking occluded objects enables maintenance of tracking of objects that would have otherwise been lost. Thus, tracking occluded objects may also reduce processing time and resources because once an object is detected and classified (e.g., as a vehicle, building, pedestrian, etc.), if it subsequently becomes occluded it can continue to be tracked and, therefore, need not be redetected and classified when it again becomes un-occluded. Accordingly, control of the autonomous vehicle may be based at least in part on tracking of an occluded object. In some examples, confidence of a track may be adjusted (e.g., reduced) in an occluded region due to, for example, errors or uncertainty introduced by multi-path or multi-bounce returns. Still further, by tracking objects in occluded regions, safety of the autonomous vehicle may be improved. For example, because the planner system of the autonomous vehicle has information about the location and/or trajectory of objects in the occluded region of the environment surrounding the autonomous vehicle, the planner system is able plan trajectories for the autonomous vehicle that will avoid or otherwise take into account the location and/or trajectory of the occluded objects.

In some instances, and as noted above, a radar spatial grid can include a plurality of cells. In some instances, the cells can represent or include a temporal logic symbol that can be used in a temporal logic formula to evaluate or validate a trajectory of an autonomous vehicle. For example, the autonomous vehicle may be prevented from initiating a trajectory until an occupancy state and/or occlusion state of cells in the path of the vehicle are free space (e.g., unoccupied and un-occluded). In some instances, a planning system of the autonomous vehicle can use temporal logic, such as linear temporal logic or signal temporal logic, to evaluate trajectories for the autonomous vehicle based at least in part on the temporal logic symbols associated with the radar spatial grid.

The techniques discussed herein can improve a functioning of a computing device in a number of ways. For example, in the context of evaluating a radar spatial grid, an area of the grid can be sized to ensure safe traversal of regions by the autonomous vehicle without excessive resources devoted to unnecessary determinations about the environment. In some instances, using multiple sensor modalities (e.g., radar sensors, lidar sensors, image sensors, etc.) can improve an overall confidence level associated with an occlusion state or occupancy state of an occlusion field. Improved trajectory generation can improve safety outcomes and can improve a rider experience (e.g., by ensuring an intersection is clear before initiating a trajectory, by reducing occurrences of emergency braking, swerving, and the like). These and other improvements to the functioning of the computer and/or to the user experience are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two.

FIG. 1 is a schematic view of an environment 100 through which a vehicle 102 is driving. In the illustrated example, the vehicle 102 includes one or more sensor system(s) 104 capturing data representing the environment 100. By way of example and not limitation, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, and as noted above, the vehicle 102 can be associated with sensor system(s) 104 that can be disposed on the vehicle 102. The sensor system(s) 104 can include radio detection and ranging (radar) sensors, light detection and ranging (lidar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor system(s) 104 can generate sensor data, which can be utilized by vehicle computing device(s) 106 associated with the vehicle 102. However, in other examples, some or all of the sensor system(s) 104 and/or vehicle computing device(s) 106 may be separate from and/or disposed remotely from the vehicle 102 and data capture, processing, commands, and/or controls may be communicated to/from the vehicle 102 by one or more remote computing devices via wired and/or wireless networks.

In at least one example, the vehicle computing device(s) 106 can utilize sensor data captured by the one or more sensors systems 104 in a spatial monitoring component 108. For example, the spatial monitoring component 108 can generate and maintain one or more spatial grids, including a radar spatial grid 110, that include cells associated with regions of the environment. Each cell of the radar spatial grid 110 can be labeled to designate whether the region of the environment corresponding to the respective cell is occupied, occluded, and/or free space. In some examples, one or more of the cells may be labeled to indicate a confidence level that the respective cell(s) are occupied, occluded, and/or free space. For instance, a cell of the radar spatial grid 110 may be labeled with a first confidence that it is occupied, a second confidence that it is occluded, and/or a third confidence that it is free space. The radar spatial grid 110 is shown as an 8×8 grid for simplicity in this example. However, in other examples, any size (e.g., area in the real world associated with the spatial grid), shape (e.g., length and width of the spatial grid), and resolution (e.g., size of cells used to make up the spatial grid) may be used for the radar spatial grid 110 depending on the accuracy and precision needed, memory size constraints, processing speed and load constraints, sensor range limitations, and the like. In some examples, a spatial grid may be sized and shaped to match a reliable range of the sensor system(s) that are used to capture sensor data from which the spatial grid is populated, and the resolution may be chosen by maximizing accuracy and precision needed for a given application given memory and processing constraints. In some examples, the length and the width may be the same, while in other examples the length and width may be different. In one specific example, the size of the spatial grid may be approximately 50-200 meters wide×approximately 50-200 meters long, with a resolution of 0.25 meters per cell.

By way of example, and without limitation, the vehicle 102 is capturing sensor data, including radar sensor data, while traversing the environment 100. In the illustrated example, the sensor systems 104 include a radar sensor 112 having a field of view β covering at least a portion of the environment 100 surrounding the vehicle 102. The portion of the environment 100 captured by the field of view is depicted in this example as sensed region 114. In various examples, the vehicle 102 may have any number of one or more radar sensors (e.g., 1, 2, 4, 5, 8, 10, etc.). In the illustrated example, the field of view β is depicted as being about a 110-degree view. However, in other examples, the field of view of the radar sensors can be greater than (e.g., 120 degrees, 180 degrees, 220 degrees, 270 degrees, 360 degrees, etc.) or less than (e.g., 90 degrees, 60 degrees, 45 degrees, etc.) this angle. Moreover, the vehicle 102 may include multiple radar sensors having multiple different fields of view, ranges, scan rates, and the like. In some examples, such as the example shown in FIG. 6, the vehicle may include multiple radar sensors with at least partially overlapping fields of view such that multiple radar sensors capture at least portion of the environment 100 in common.

In the illustrated example, multiple objects are located in the sensed region 114. The multiple objects in this example include a static object 116 (e.g., a tree, pole, sign, building, parked car, etc.) and a dynamic object 118 (e.g., a pedestrian, vehicle, bicycle, animal, etc.). The radar sensor 112 captures radar sensor data corresponding to the static object 116 and the dynamic object 118, and the spatial monitoring component 108 generates or updates the radar spatial grid 110 to designate cells of the radar spatial grid 110 that correspond to the regions of the environment 100 at which the static object 116 and the dynamic object 118 are located as being occupied. A location of the radar sensor 112 is depicted in a lower left portion of the radar spatial grid 110 for reference. Two dashed arrows extend from the lateral edges of the radar sensor 112 and schematically depict the field of view β of the radar sensor 112. The cells within the portion of the radar spatial grid 110 bounded by the dashed arrows correspond to the sensed region 114. As shown, the radar spatial grid 110 includes four cells designated as being a statically occupied region 120. These four cells correspond to the region of the environment 100 at which the static object 116 is located. The radar spatial grid 110 also includes two cells designated as being a dynamically occupied region 122, which correspond to the region of the environment 100 at which the dynamic object 118 is located. Based on the locations of the statically occupied region 120 and the dynamically occupied region 122 relative to the radar sensor 112, the spatial monitoring component 108 may determine portions radar spatial grid that are occluded by the static object 116 and dynamic object 118, respectively. As discussed at other locations in the application, whether or not a cell is occluded may be determined by, for example, ray casting from a center of the radar sensor 112 (or other location) to an edge or extent of each occupied region (or each cell designated as being occupied) and the cells located further from the radar sensor 112 than the occupied cell(s) and bounded by the rays may be determined to be occluded. The spatial monitoring component 108 may designate cells of the radar spatial grid 110 as being occluded. In the illustrated example, the cells occluded by the statically occupied region 120 are shown as occluded region 124 and the cells occluded by the dynamically occupied region 122 are shown as occluded region 126. In this example, cells that are within the field of view of the radar sensor 112 and are neither occupied nor occluded are determined to be free space and are designated as such on the radar spatial grid 110 as free space region 128. In this example, cells that are outside the field of view of the radar sensors may be designated as being indeterminate or may simply be left without a designation. However, in other examples, one or more cells that are within a field of view of one or more of the radar sensors, but for which a confidence of occupancy status is low, may be designated as having indeterminate occupancy status.

In some examples, the vehicle 102 can access map data and can determine that the radar spatial grid 110 is associated with a portion of the map data. In that case, the vehicle 102 can use the map data to supplement and provide context to the radar spatial grid 110. For instance, the vehicle 102 may be able to use the radar spatial grid 110 to help localize the vehicle 102 to a particular location on the map. Additionally or alternatively, the map data may enable to vehicle 102 to further refine or reason about the spatial designations (occupied, occluded, free space) of the radar spatial grid 110. For instance, the vehicle 102 may determine, based on the map data, that cells of the radar spatial grid 110 designated as being occluded are associated with an intersection or cross-street and a planner system of the vehicle 102 may plan a trajectory to approach the occluded intersection/cross-street with caution.

In some instances, when a cell of the radar spatial grid 110 is designated as being occupied by an object, the cell can store additional metadata indicating a semantic label of the object and/or data indicative of a path of the object through the occlusion grid. Additional details directed to generating and maintaining a radar spatial grid are discussed below.

Figure 2:
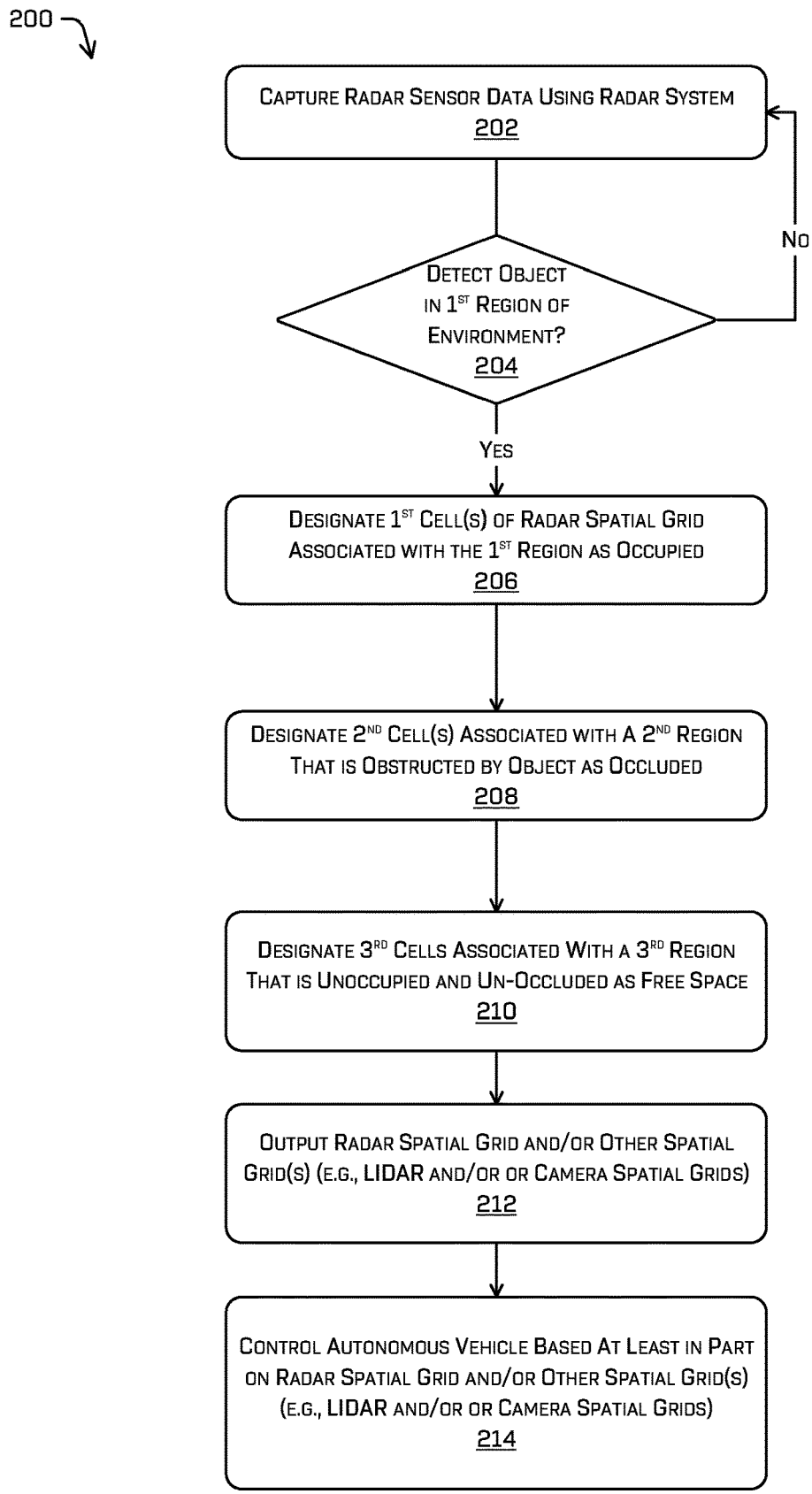
FIG. 2 is a flow diagram of an example process for generating a radar spatial grid, outputting the radar spatial grid and/or controlling an autonomous vehicle based upon the radar spatial grid, in accordance with embodiments of the disclosure.

FIG. 2 is a flow diagram of an example process 200 for generating a radar spatial grid, outputting the radar spatial grid and/or controlling an autonomous vehicle based upon the radar spatial grid, in accordance with embodiments of the disclosure. Although discussed in the context of radar data, the example process 200 can be used in the context of and/or in combination with lidar data, sonar data, time-of-flight image data, and the like. Also, while FIG. 2 is described with reference to a radar spatial grid corresponding to a single radar sensor, the techniques are also applicable to radar spatial grids populated based on multiple radar sensors.

At operation 202, a radar system is used to capture radar sensor data from an environment. In some examples, the radar system may include one or more radar sensors and may be a sensor system of an autonomous vehicle, such as vehicle 102 described above. The radar sensor data may include multiple returns, including static returns corresponding to objects having a location and a zero velocity, and dynamic returns or radar tracks corresponding to moving objects having a location and a non-zero velocity. A perception system of a vehicle computing device (e.g., vehicle computing device 106), may process the radar sensor data and determine whether or not objects are present in the environment. At operation 204, the process 200 detects whether or not an object is located within a sensed region of the radar sensor. If not, the process returns at operation 202 to capture additional radar sensor data over time. If, at operation 204, an object is detected within the sensed region of the radar sensor (e.g., at a first region of the environment), the process continues to operation 206, at which one or more cells (e.g., first cell(s)) of the radar spatial grid are designated as being occupied by the object. The radar spatial grid includes multiple cells, each of which is associated with a discrete portion of the environment. Individual cells of the radar spatial grid may be designated to indicate that the respective cell is occupied by an object. The number of cells corresponding to each object depends on the size of the object and the scale or resolution of the radar spatial grid. As discussed throughout this disclosure, the radar spatial grid can represent any size or shape of an environment. By way of example and not limitation, a cell may represent an area 1 meter wide by 1 meter long, although any size may be used for the cells. In that case, an object having dimensions of 2 meters×2 meters would be represented by four cells designated as being occupied in the radar spatial grid.

In some instances, a determination regarding the occupancy status of an individual cell can be associated with an occupancy probability. In some instances, an occupancy probability of a cell can be based at least in part on a number of returns associated with the cell, a number of radar sensors having a return associated with the cell, and/or a historical number of returns associated with the cell in previous time intervals. However, any techniques or heuristics can be used to determine an occupancy probability associated with a cell of the radar spatial grid. In some examples, where an occupancy probability level is not exceeded, where no sensor data is returned, or where no determination of occupancy is otherwise able to be made, the cell may be designated as indeterminate (e.g., there is not enough information to determine the occupancy state of the cell). Additional details including examples of when and how cells of a radar spatial grid are designated as being occupied are provided below with reference to FIG. 3.

At operation 208, one or more cells of the radar spatial grid may be designated as being occluded based at least in part on a location of an occupied cell relative to a location of the radar sensor. For instance, based on the location of the first cell(s) designated as being occupied at operation 206 relative to a location of the radar sensor, one more second cells that are obstructed by the object (i.e., the first cell(s) designated as occupied are interposed between a location of the radar sensor and the second cells) may be designated as being obstructed. Additional details including examples of when and how cells are designated as being obstructed are provided below with reference to FIG. 5.

At operation 210, one or more third cells which are within a field of view of the radar sensor and which are not designated as being occupied or occluded are designated as being free space. The radar spatial grid may be updated substantially continually (e.g., as additional sensor data is received and processed) or periodically (e.g., at a periodic of approximately 10 hertz, 30 hertz, etc.) and may, at operation 212, be output for use by one or more computing devices. The radar spatial grid that is output may be based on radar data of a single radar sensor, or may be based on data from multiple radar sensors and/or other sensor modalities (e.g., lidar or camera spatial grids). Additional details including examples of fusing or otherwise combining sensor data from multiple radar sensors are provided below in connection with FIG. 6.

In some examples, at operation 214, the spatial grid may be used by a vehicle computing device (e.g., vehicle computing device 106) of an autonomous vehicle to control the autonomous vehicle to safely traverse the environment. The spatial grid may be updated as the vehicle traverses the environment and as dynamic objects in the environment move relative to the vehicle. The spatial grid may be used by the vehicle computing device to more quickly and accurately plan a trajectory for the autonomous vehicle through the environment. For example, the vehicle computing device may plan a trajectory to pass through regions of the environment that correspond to free space cells of the radar spatial grid and/or to avoid regions of the environment that correspond to occupied cells of the radar spatial grid. However, the fact that a region associated with a radar spatial grid cell designated as being free space, does not necessarily mean that the region is an available path for a vehicle to travel. For instance, a region may be unoccupied and un-occluded, but be unsuitable for driving because it is not a drivable surface (e.g., a curb, a lawn, etc.). Thus, the vehicle computing device may further rely on one or more other sensor system and/or map data to identify areas of the environment that are safe to drive. Because the radar spatial grid designates each cell as one of occupied, occluded, or free space, a range of potential trajectories for the vehicle may be reduced (or bounded) by the radar spatial grid, thereby reducing processing time and resources used by a planning system of the vehicle computing device to plan a trajectory for the vehicle.

In some examples, when a cell is occupied, indeterminate, and/or when a threshold number of cells of a spatial grid (e.g., radar spatial grid 110) are occupied by an object, the operation 214 can include controlling the autonomous vehicle (e.g., the vehicle 102) to wait without traversing the portion of the environment (e.g., environment 100). In such examples, additional radar/sensor information received during the waiting period may provide sufficient information to for the vehicle to safely traverse the portion of the environment (e.g., determining that no objects are passing through an occluded region, making traversal possible). In some examples, where a sufficiency of information is below a threshold value (e.g., a number of occupied or indeterminate cells meets or exceeds a threshold value and/or the number of occluded cells meets or exceeds a threshold such that a planning system is unable to determine a safe trajectory to navigate the area), the operation 214 can include commanding the vehicle 102 to creep forward (e.g., advance a distance beyond a stop line and/or into an intersection) or otherwise change a location of the vehicle 102 to gather additional information.

In some examples, a sufficiency of information can correspond to determining a number of cells that are designated as free space meets or exceeds a threshold number and/or the number of cells designated as occluded and/or indeterminate is below a threshold (e.g. low enough for safely planning a trajectory to cross the region). In some instances, a sufficiency of information can include observing a region associated with a cell designated as indeterminate for a period of time to increase a confidence level that the cell is unoccupied. In some instances, a sufficiency of information can include determining an extent of an un-occluded and unoccupied region relative to a distance for an autonomous vehicle to travel and/or relative to a velocity, acceleration, and/or time for the autonomous vehicle to traverse a portion of the region.

Figure 3:
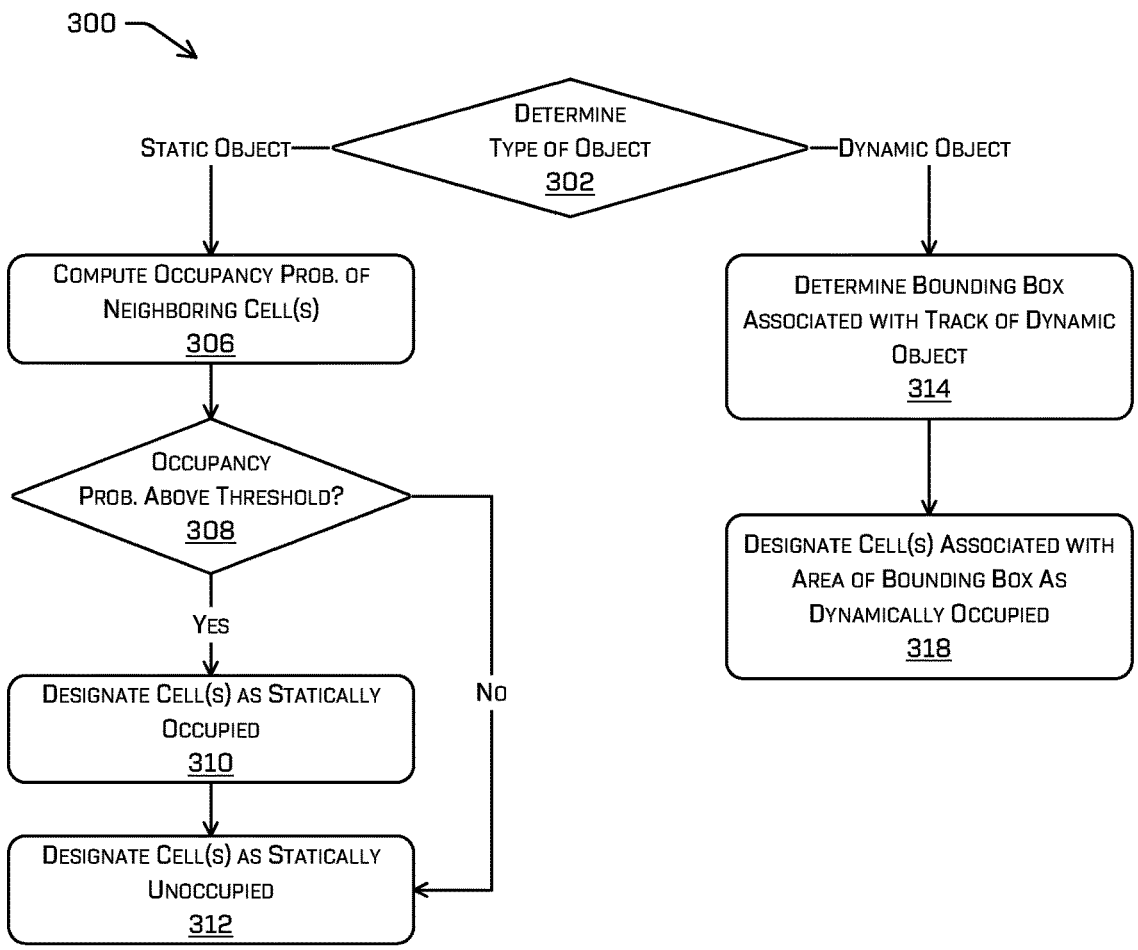
FIG. 3 is a pictorial flow diagram of an example process for determining an occupancy of cells in a radar spatial grid based on radar sensor data representing static and/or dynamic objects in the environment, in accordance with embodiments of the disclosure.
Figure 3:
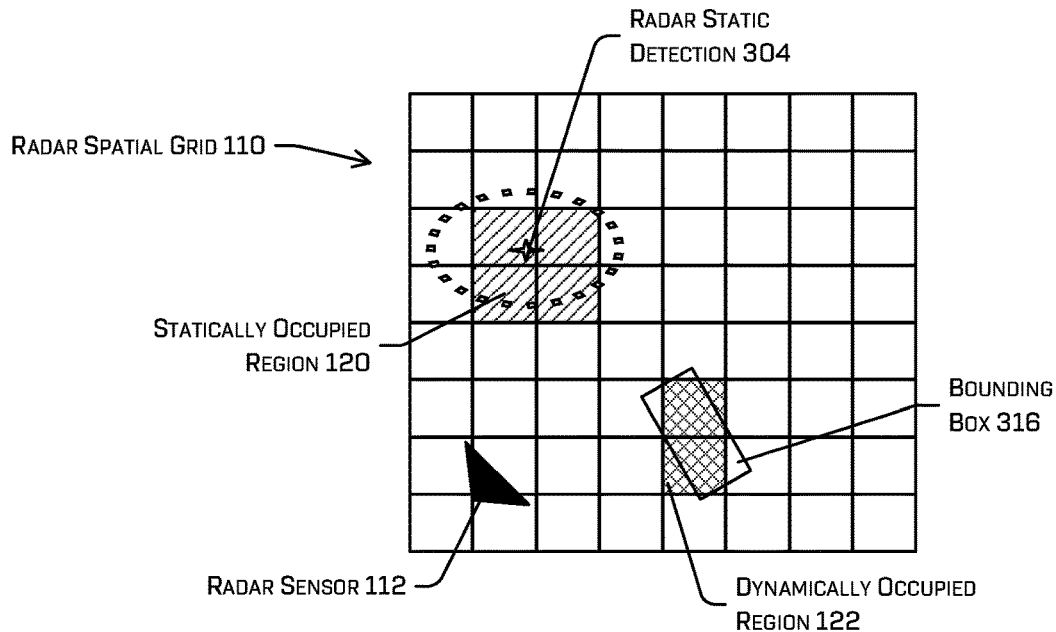

FIG. 3 is a pictorial flow diagram of an example process 300 for designating cells of a spatial grid as being occupied, in accordance with embodiments of the disclosure.

As shown in FIG. 3, cells of the radar spatial grid 110 may be designated as being occupied by mapping radar sensor data (e.g., radar returns) of the environment to corresponding cells of the radar spatial grid. In the illustrated example, the process 300 differs for static objects (e.g., buildings, parked vehicles, vegetation, etc.) and dynamic objects (e.g., vehicles, bicycles, pedestrians, etc.). Thus, at operation 302, the process can include determining a type of object that is detected. In the illustrated example, the type of object can be either static or dynamic. However, in other examples, additional or alternative object types and/or characteristics may be determined for detected objects (e.g., reflectivity, permittivity, absorptivity, density, or the like).

In the case of a static object, a static radar detection 304 having zero velocity is received. A first cell of the radar spatial grid associated with the location of the static radar detection 304 is designated as being occupied. At operation 306, occupancy probabilities are computed for cells neighboring the first cell (e.g., adjacent to, at most a number of cells (e.g., 2, 3, etc.) away from, or at most a distance (e.g., 1 meter, 5 meters, etc.) away from the first cell) based on the static radar return and historical returns and, at operation 308, the process 300 determines whether the occupancy probability is above a threshold. The dots surrounding the radar static detection schematically represent a neighborhood, within which the occupancy probably of cells is determined. In some examples, the dots surrounding the radar static detection may represent a gaussian distribution. The shape of the size and neighborhood of the radar return may depend on noise or other characteristics of the radar sensors, placement of the radar sensors, orientation of the radar sensors, or other factors. In some examples, the neighborhood may be circular, elliptical, generally rectangular, irregular shaped, or any other shape. In some examples, the threshold probability may be predetermined or may be dependent on one or more operating conditions (e.g., speed of the vehicle, sparseness of radar returns, etc.). The occupancy probability of a cell can be based at least in part on a number of returns associated with the cell, a number of radar sensors having a return associated with the cell, and/or a historical number of returns associated with the cell in previous time intervals. However, any techniques or heuristics can be used to determine an occupancy probability associated with a cell of the radar spatial grid. At operation 310, each adjacent cell having an occupancy probability above a threshold probability is designated as being occupied. The threshold probability may be predetermined or may be dependent on one or more operating conditions (e.g., speed of the vehicle, sparseness of radar returns, etc.). In the illustrated example, the three cells on the right, below, and diagonally below/right of the first cell were found to have occupancy probability above the threshold and are designated as being occupied. Collectively the first cell and the three neighboring cells on the right, below, and diagonally below/right are designated as the statically occupied region 120. In the event that neighboring cells have an occupancy probability less than or equal to the threshold, the neighboring cells are, at operation 312 designated as unoccupied (or as being free space). In some examples, where an occupancy probability level is not exceeded, where no (or insufficient) sensor data is returned, or where no determination of occupancy is otherwise able to be made, the cell may be designated as indeterminate (e.g., there is not enough information to determine the occupancy state of the cell).

In the case of a dynamic object, radar sensor data corresponding to a dynamic object is received from the radar sensor 112 the radar sensor data includes a location and a velocity, which are provided to a tracker of a vehicle computing device (e.g., vehicle computing device 106). At operation 314, a bounding box 316 corresponding to a position and/or orientation of the dynamic object can be determined (e.g., by the tracker of the vehicle computing device 106). The tracker outputs the bounding box 316 representing a size, shape, and/or pose of the tracked dynamic object. The tracker may additionally or alternatively output a trajectory or vector representing a current direction of travel of the dynamic object. At operation 318, one or more cells of the radar spatial grid associated with a region occupied by the bounding box are designated as being occupied by the dynamic object (e.g., dynamically occupied). In some examples, the cells of the radar spatial grid may further be labeled with a trajectory or vector (velocity and direction) of the dynamic object. In the illustrated example, two cells corresponding to a region occupied by the bounding box are designated as being the dynamically occupied region 122.

Figure 4:
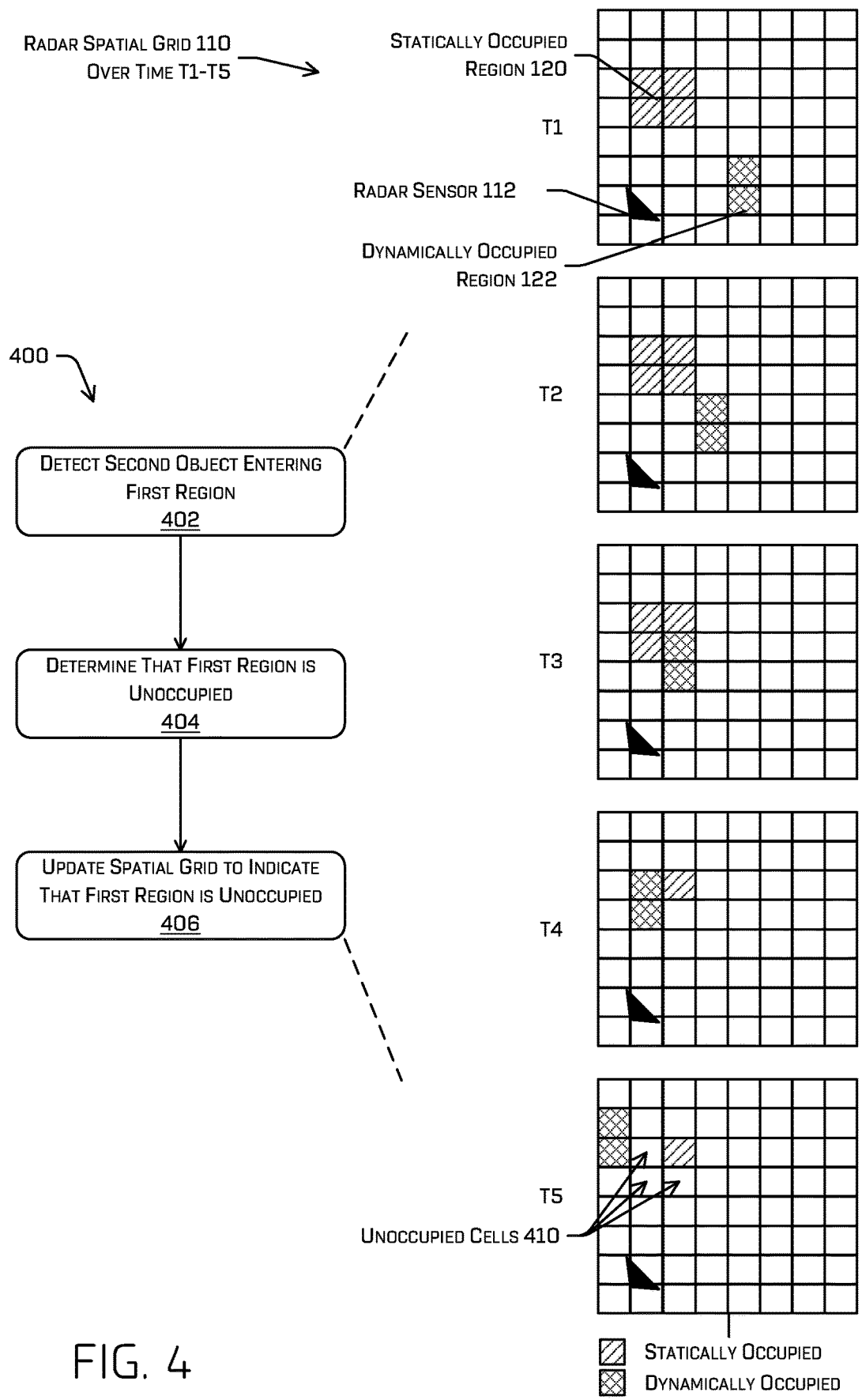
FIG. 4 depicts a pictorial flow diagram of an example process for updating an occupancy status of cells of a radar spatial grid when an object enters a region previously thought to be occupied by a static object, in accordance with embodiments of the disclosure.

FIG. 4 is a pictorial flow diagram illustrating a process 400 for updating an occupancy status of one or more cells of a radar spatial grid based on observing a dynamic object move into and/or through a region previously indicated as being occupied by another object (e.g., a static object). In some examples, various radar sensors may not be able to differentiate height (e.g. they only provide two-dimensional information) and, as such, may receive returns from a region (e.g., an overpass, a bridge, etc.), despite the region having a driveable surface or otherwise being navigable. In a particular example, the first object may be at a different elevation than the vehicle and the second object, thus the region may appear based on the radar returns to be occupied by a static object (e.g., an overpass) when in fact the region at the elevation of the vehicle and second object is not occupied. As shown in FIG. 4, a sequence of views of the radar spatial grid 110 is shown from time T1 though time T5. A relative position of radar sensor 112 is shown in the lower left corner of the radar spatial grid 110. During this period of time, a dynamic object represented on the radar spatial grid 110 as dynamically occupied region 122 translates from a lower right portion of the radar spatial grid 110 toward an upper left portion of the radar spatial grid 110.

The process 400 includes, at operation 402, detecting a first region (e.g., the statically occupied region 120) and a second object (e.g., the dynamic object) entering the first region. This is shown schematically on the radar spatial grid 110 at T3, which illustrates the dynamically occupied region 122 entering a first cell of the region previously designated as statically occupied region 120. At T4, the dynamically occupied region 122 continues to pass through the region previously designated as statically occupied region 120. At time T5, the dynamically occupied region 122 has moved beyond the region previously designated as the statically occupied region 120. At operation 404, based on the dynamic object passing through the region previously thought to be occupied by the static object, a computing device (e.g., vehicle computing device 106) may determine that the static object does not in fact occupy at least the portion of the region through which the dynamic object passed, and that at least the cells through which the dynamic object passed are unoccupied. At operation 406, the radar spatial grid 110 may be updated to show that the cells of the first region (i.e., the cells through which the dynamic object passed) are unoccupied. This may be accomplished by designating these cells as free space or designating them as indeterminate. This is illustrated by the radar spatial grid 110 at time T5, in which three cells, previously part of the statically occupied region 120, have been updated to designate them as being unoccupied cells 410.

In some examples, such as the example shown in FIG. 4, only those cells through which the dynamic object passed may be updated to designate them as unoccupied (e.g., free space or indeterminate). However, in other examples, the computing device (e.g., vehicle computing device 106) may determine that the entire region previously designated as being occupied by the static object (e.g., the entire statically occupied region 120) is unoccupied. For example, if the computing device previously determined that the entire statically occupied region 120 corresponded to a single object (e.g., using edge detection or segmentation techniques), then if a dynamic object passes through any portion of the statically occupied region the computing device may determine that the entire region is unoccupied (e.g., as located at a different elevation).

Figure 5:
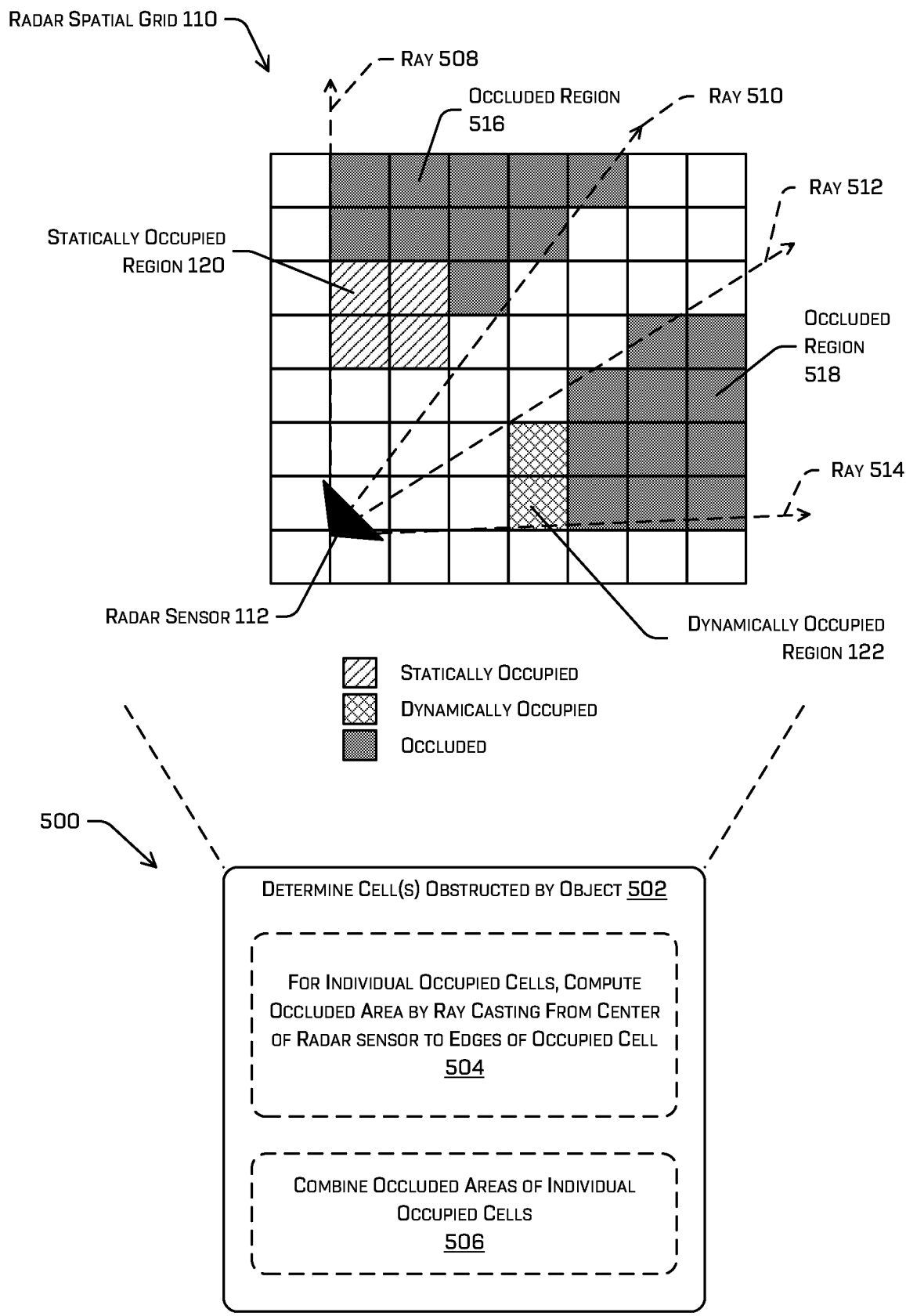
FIG. 5 is a pictorial flow diagram of an example process for determining cells of a radar spatial grid that are obstructed by an object in the environment, in accordance with embodiments of the disclosure.

FIG. 5 is a pictorial flow diagram of an example process 500 for determining cells of a radar spatial grid that are obstructed by an object in the environment, in accordance with embodiments of the disclosure.

As shown in FIG. 5, at operation 502, a computing device (e.g., vehicle computing device 106) can determine one or more cells that are obstructed by an object detected in the environment. Cells can be determined to be occluded in a variety of different ways. In some examples, at operation 504, occluded cells can be computed for each occupied cell by ray casting rays from a center of the radar sensor 112 (or other location) through points at edges/extents of the respective occupied cell. An area bounded by the portions of the rays extending beyond the occupied cell constitute the occluded region of the cell. In that case, at operation 506, the occluded cells for each occupied cell may be combined by taking the union of cells determined to be occluded for all of the occupied cells. In some examples, the operation 502 may include casting a ray from a center of the radar sensor 112 (or other location) through a center (or other location) of each cell, and designating cells through which the ray passes after having passed through an occupied cell as being occluded.

In other examples, operation 502 may include determining cells of the radar spatial grid 110 that are occluded by ray casting rays 508, 510, 512, and 514 from a center of the radar sensor 112 (or other location) through points at edges/extents of an occupied region (e.g., if the occupied region is contiguous and constitutes more than one cell of the radar spatial grid as in the example of FIG. 5). As shown, rays 508 and 510 pass through points at the edges/extents of statically occupied region 120. A region of cells beyond the statically occupied region 120 and bounded between rays 508 and 510 (or having a majority of their area falling within this boundary) is determined to be a first occluded region 516. Similarly, rays 512 and 514 pass through points at the edges/extents of dynamically occupied region 122, and a region of cells beyond the dynamically occupied region 122 and bounded between rays 512 and 514 (or having a majority of their area falling within this boundary) is determined to be a second occluded region 518. Regardless of how the occlusion state is computed, once a cell is determined to correspond to an occluded region, the cell may be designated, at operation 208, as being occluded.

FIGS. 2-5 illustrate example processes in accordance with embodiments of the disclosure. The processes illustrated in FIGS. 2-5 may, but need not necessarily, be used together. These processes are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, causer a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
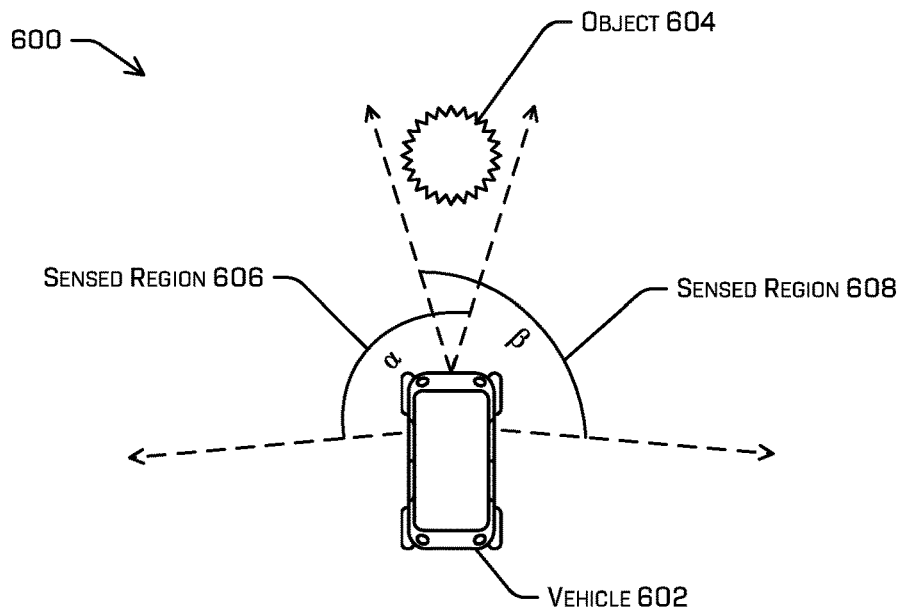
FIG. 6 is schematic diagram of an example of fusing data from multiple radar sensors into a fused radar spatial grid, in accordance with embodiments of the disclosure.
Figure 6:
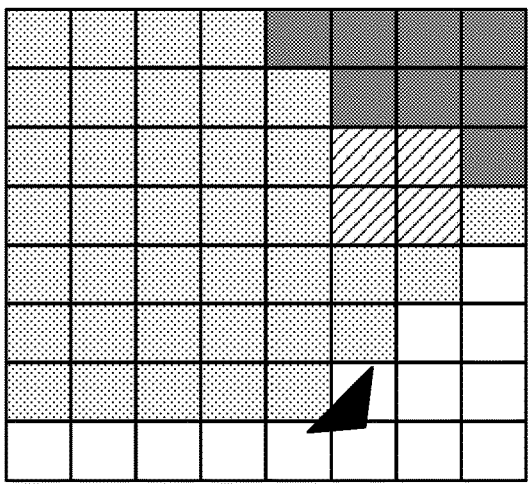
Figure 6:
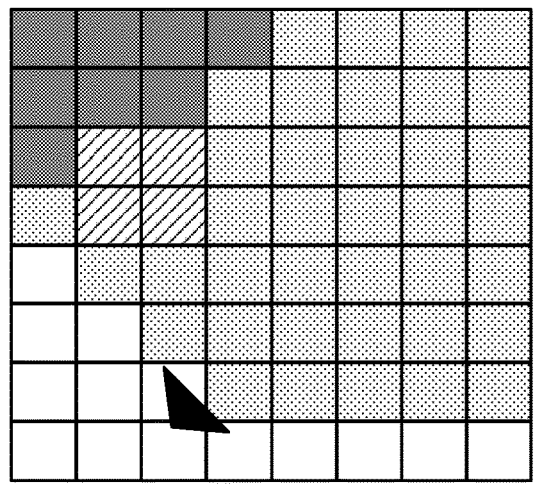
Figure 6:
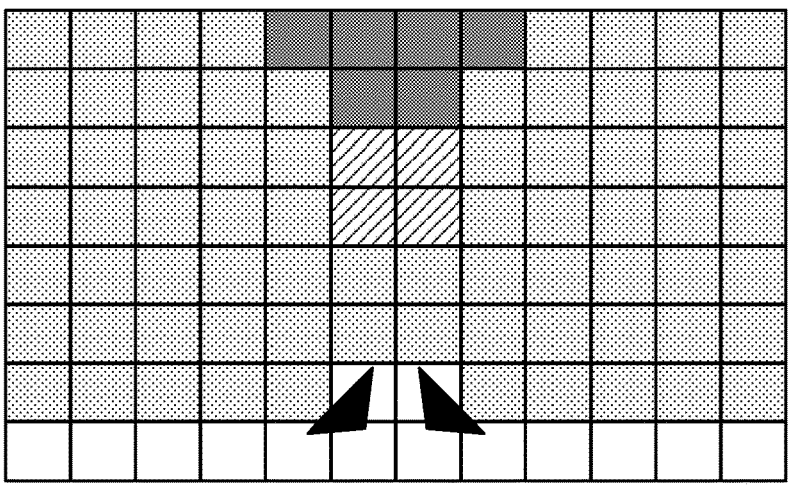

FIG. 6 is schematic diagram of an example of fusing data from multiple radar sensors into a fused radar spatial grid, in accordance with embodiments of the disclosure.

FIG. 6 illustrates an environment 600 through which a vehicle 602 traverses. As shown, the environment 600 includes an object 604. The vehicle 602 may be the same as or different than that shown in FIG. 1. In the example of FIG. 6, the vehicle 602 includes a radar system having multiple radar sensors, including at least a first radar sensor and a second radar sensor. In the example of FIG. 6, the first radar sensor has a first field of view α covering at least a portion of the environment 600 surrounding the vehicle 602. The portion of the environment 600 captured by the first field of view a is depicted in this example as sensed region 606. The second radar sensor has a second field of view β covering at least a portion of the environment 600 surrounding the vehicle 602. The portion of the environment 600 captured by the second field of view β is depicted in this example as sensed region 608. In various examples, the vehicle 102 may have any number of one or more radar sensors (e.g., 1, 2, 4, 5, 8, 10, etc.). As shown, the first field of view α and the second field of view β cover different but overlapping portions of the environment 600. In the illustrated example, the first field of view a and the second field of view β are depicted as both being about a 110-degree view. However, in other examples, the fields of view of the radar sensors can be greater than or less than this angle. Moreover, the first and second radar sensors different fields of view, ranges, scan rates, and the like.

In the example of FIG. 6, the object 604 falls within the sensed regions 606 and 608 of both radar sensors. Because the radar sensors are positioned at different locations of the vehicle (e.g., right and left sides of the vehicle, front and top of the vehicle, front and side of the vehicle, or other locations) and/or different orientations or poses, the radar sensors have different perspectives from which to observe the environment 600. A radar spatial grid 610 of the first radar sensor and a radar spatial grid 612 of the second radar sensor are shown. In each grid, the object 604 is represented as a 2×2 region of cells that are statically occupied. While separate spatial grids are shown for each radar sensor in this example, in other examples sensor data of multiple radar sensors may be simultaneously represented on a single spatial grid, with each radar sensor having a relative position on the spatial grid. However, owing to the different perspectives of the first and second radar sensors, the cells of the radar spatial grid 610 of the first radar sensor that are designated as being occluded and being free space are different than the cells of the radar spatial grid 612 of the second radar sensor that are designated as being occluded and being free space. In particular, the radar spatial grid 610 of the first radar sensor shows more cells designated as being occluded on a right side of the statically occupied region, whereas the radar spatial grid 612 of the second radar sensor shows more cells designated as being occluded on a left side of the statically occupied region. Additionally, some cells in the radar spatial grid 610 of the first radar sensor are designated as free space that are outside the field of view of the second radar sensor and vice versa.

By fusing or otherwise combining the radar spatial grid 610 of the first radar sensor and the radar spatial grid 612 of the second radar sensor, a fused radar spatial grid 614 can be obtained. Alternatively, a fused radar spatial grid 614 can be obtained by combining radar sensor data from the first radar sensor and the second radar sensor on a single spatial grid. As shown, the fused spatial grid 614 includes fewer cells designated as being occluded and more cells designated as free space than either of the radar spatial grid 610 of the first radar sensor or the radar spatial grid 612 of the second sensor. Additionally, the fused radar spatial grid 614 encompasses a larger region of the environment 600 surrounding the vehicle 602 than either of the radar spatial grid 610 of the first radar sensor or the radar spatial grid 612 of the second sensor. Additionally, the fused radar spatial grid 614 may have higher confidence values associated with the occupancy status of individual cells because it may be based upon a higher number of radar returns (e.g., the returns from both the first and second radar sensors) at least in the overlapping portion of their fields of view.

As discussed elsewhere in the application, radar sensor data from multiple radar sensors can be fused in a variety of ways. In the example of FIG. 6, the first radar spatial grid 610 corresponding to the first radar sensor is combined with the second radar spatial grid 612 of the second radar sensor by designating the union of the occupied cells of both spatial grids as being occupied, and designating the intersection of the occluded cells of both spatial grids as being occluded. In other words, a cell of the fused radar spatial grid can be designated as being occupied when radar sensor data of the first radar sensor, the second radar sensor, or both the first and second radar sensor, indicate that the region corresponding to the cell of the spatial grid is occupied. Whereas, a cell of the fused radar spatial grid can be designated as being occluded when radar sensor data of both the first radar sensor and the second radar sensor indicate that the region corresponding to the cell of the spatial grid is occluded. Cells of the fused radar spatial grid may be designated as being free space based at least in part on the radar sensor data of the first radar sensor and the second radar sensor. In one specific example, a cell of the fused radar spatial grid may be designated as free space if it is within the field of view of either radar sensor and is neither designated as being occupied nor occluded (e.g., it is unoccupied and un-occluded) in the fused radar spatial grid 614.

Figure 7:
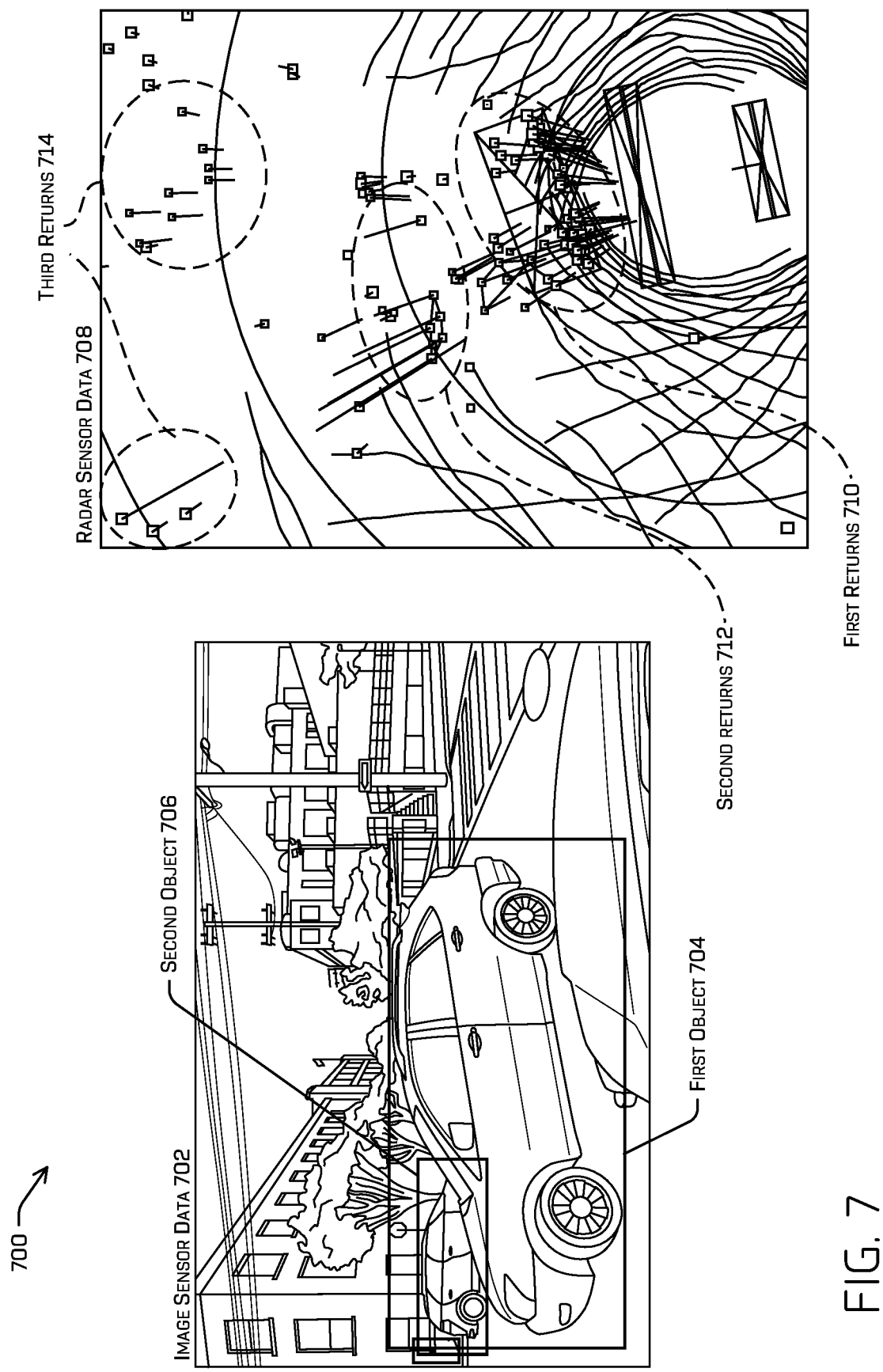
FIG. 7 is a schematic diagram of an example of detecting and/or tracking objects in occluded regions of an environment, in accordance with embodiments of the disclosure.

FIG. 7 is a schematic diagram 700 illustrating an example of detecting and/or tracking objects in occluded regions of an environment, in accordance with embodiments of the disclosure.

FIG. 7 illustrates on the left image sensor data 702 captured by a camera or other image sensor. The image sensor data 702 depicts a first object 704 (a first vehicle in this example) and a second object 706 (a second vehicle in this example). The image sensor data 702 was captured at time when the second object 706 is only partially occluded by the first object 704. Thus, a computing device (e.g., a perception system of vehicle computing device 106) can detect and classify the first object 704 and the second object, and a tracker (e.g., a tracker system of vehicle computing device 106) can track motion of the first object 704 and the second object 706 based on the image sensor data 702. However, if the second object 706 becomes blocked from view of the image sensor (e.g., if the first object 704 turns in front of the second object 706), the perception sensor may no longer be able to detect or track the second object 706. However, in some examples, making use of multi-bounce returns and/or multi-path returns, a radar senor may still be able to detect and track an object even when it is occluded from view of the image sensor and even when it is occluded from direct view of the radar sensor.

FIG. 7 also shows on the right, radar sensor data 708 corresponding to the same scene depicted in the image sensor data 702 but at a slightly later time at which the second object 706 is blocked by the first object 704 and is therefore occluded to the sensors (e.g., sensor systems 104 of vehicle 102). As shown, the radar sensor data 708 includes first returns 710 corresponding to the first object 704. Despite the fact that the second object 706 is occluded from the radar sensor by the first object 704, the radar sensor data 708 in this example still captures second returns 712 corresponding to the second object 706 by virtue of multi-path and/or multi-bounce returns. The number of returns in the second returns 712 may be lower due to the number of bounces or reflections. Thus, a confidence level of detecting the second object 706 in the occluded region based on the second returns 712 may be lower. However, the second returns 712 may still be sufficient to track the second object 706 in the occluded region. In some examples, confidence of a track may be adjusted (e.g., reduced) in an occluded region due to, for example, errors or uncertainty introduced by multi-path or multi-bounce returns. However, this reduced confidence may be offset when the object was previously detected prior to its occlusion, in which case its trajectory may have been known prior to it becoming occluded.

In some examples, the tracker of the vehicle computing device may track the radar returns in occluded regions over time and determine whether the returns correspond to occluded objects based at least in part on whether trajectories of the tracked returns match expected returns for the tracked object. If the trajectories of the tracked objects in the occluded region do not behave as expected, the returns may be determined to be phantom returns. In some examples, one or more machine learning algorithms may be used to recognize returns corresponding to objects in occluded regions and to distinguish returns corresponding to objects in occluded regions from phantom returns that represent noise or false detections. For instance, the radar returns may be fed to a convolutional neural network (CNN) or other machine learning model such as those described at other locations in this application.

One or more cells of a radar spatial grid corresponding to a region occupied by an occluded object (i.e., the second object 706) may be designated as being occupied. In some examples, such cells corresponding to a region occupied by an occluded object may be designated as being occupied by an occluded object. The radar spatial grid (or the raw radar sensor data corresponding to the occluded object) may be output to a tracker of the vehicle computing device and used to track the occluded object (i.e., second object 706) in the occluded region. Tracking occluded objects may allow a planning system (e.g., planning system of vehicle computing device 106) to make faster and/or more accurate planning decisions based on the location and trajectory of the occluded object. Additionally, tracking occluded objects enables maintenance of tracking of objects that would have otherwise been lost. For instance, in the example shown in FIG. 7, the second object 706 may be detected, classified, and tracked at a first time when it is visible (un-occluded) to one or more sensor systems, and this tracking may be maintained and a radar spatial grid may be updated based upon radar multi-path and/or multi-bounce returns even when the second object is occluded to the one or more sensor systems. Thus, tracking occluded objects may also reduce processing time and resources because once an object is detected and classified (e.g., as a vehicle, building, pedestrian, etc.), if it subsequently becomes occluded it can continue to be tracked and, therefore, need not be redetected and classified when it again becomes un-occluded. Accordingly, control of the autonomous vehicle may be based at least in part on tracking of an occluded object. Still further, by tracking objects in occluded regions, safety of the autonomous vehicle may be improved. For example, because the planner system of the autonomous vehicle has information about the location and/or trajectory of objects in the occluded region of the environment surrounding the autonomous vehicle, the planner system is able plan trajectories for the autonomous vehicle that will avoid or otherwise take into account the location and/or trajectory of the occluded objects. In some examples, the radar sensor data 708 may further include one or more third returns 714 corresponding to phantom returns. These phantom returns may be recognized as such and filtered out due to their confidence level being low due to the sparse number of returns, due to the fact that there is no object tracked at this location prior to occlusion of the region, and/or based on output of a machine learning algorithm trained to recognize occluded objects and/or phantom returns.

Figure 8:
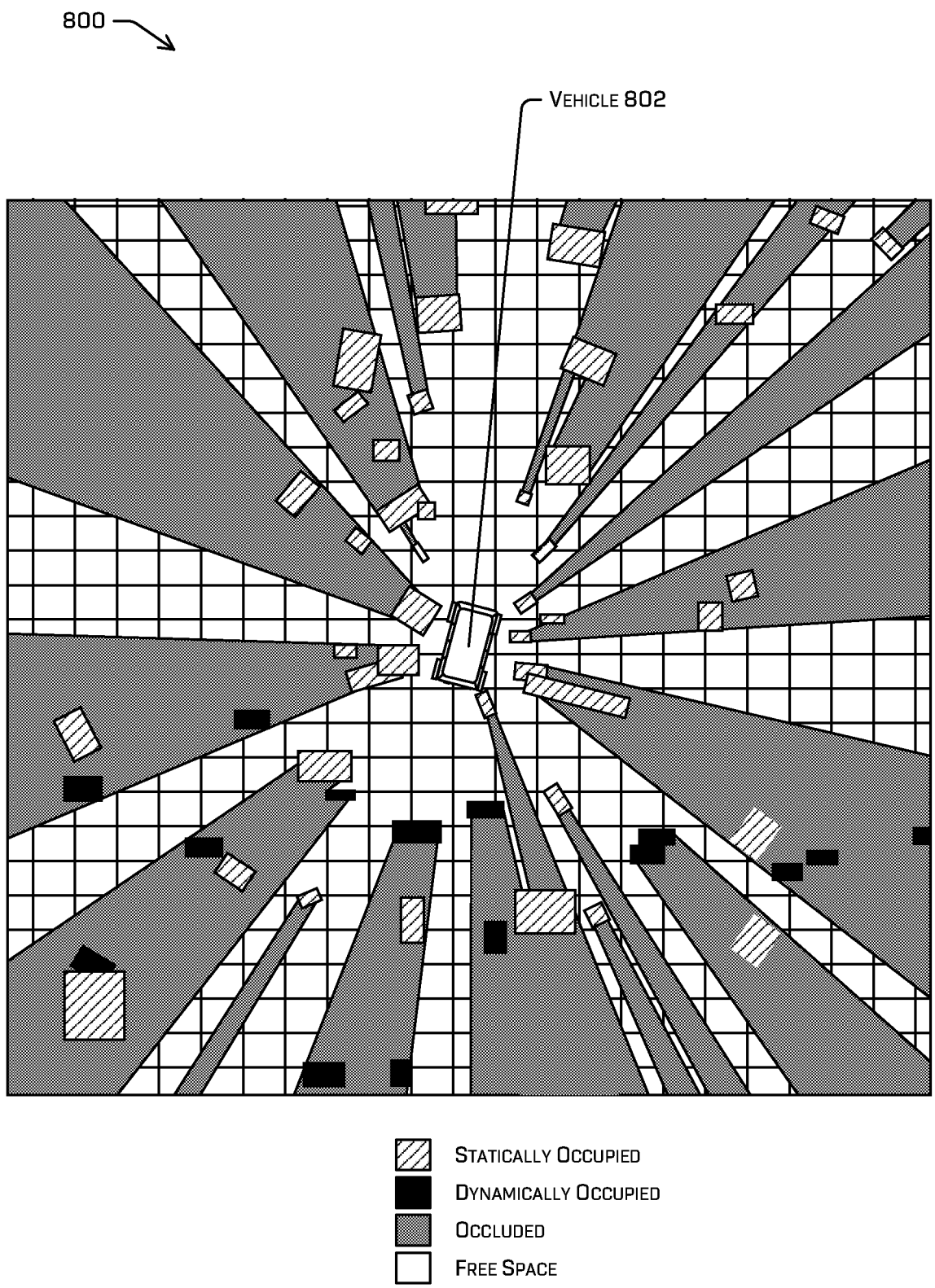
FIG. 8 is a schematic diagram of an example of a top-down, 360-degree view of fused spatial grid data, in accordance with embodiments of the disclosure.

FIG. 8 is a schematic diagram of an example of a top-down, 360-degree view of fused spatial grid data 800, in accordance with embodiments of the disclosure. For example, the fused spatial grid data 800 may represent data captured by multiple radar sensors and/or one or more other sensor modalities (e.g., lidar, cameras, sonar, etc.). In one example, the fused spatial grid data 800 may be generated based at least in part on radar sensors capturing a full 360-degree field of view around a vehicle 802. As shown, the statically occupied regions are designated in this example with hatching, while dynamically occupied regions are designated as solid black boxes. The occluded regions are designated as dark grey stippling. As the dynamically occupied areas move around the environment, the occluded regions caused by the dynamic objects would move accordingly. In this example, the fused spatial grid depicts detected objects in the occluded regions as being occupied. In at least some examples, such as that shown in FIG. 8, the vehicle 802 may have radar sensors which are able to sense in all 360 degrees around the vehicle. As such, all cells in such a spatial grid may be designated as occupied, occluded, and/or free.

FIGS. 2-8 are described with reference to components FIG. 1 by way of example. However, the examples illustrated and described with reference to FIGS. 2-8 are not limited to being performed in the environment or using the components of FIG. 1. For example, some or all of the examples described with reference to FIGS. 2-8 can be performed by one or more components in FIG. 9, as described herein, or by one or more other systems or components.

FIG. 9 depicts a block diagram of an example system 900 for implementing the techniques described herein. In at least one example, the system 900 can include a vehicle 902, which may be the same as or different than the vehicle 102 shown in FIG. 1.

The vehicle 902 can include a vehicle computing device(s) 904, one or more sensor systems 906, one or more emitters 908, one or more communication connections 910, at least one direct connection 912, and one or more drive modules 914.

The vehicle computing device 904 can include one or more processors 916 and memory 918 communicatively coupled with the one or more processors 916. In the illustrated example, the vehicle 902 is an autonomous vehicle. However, the vehicle 902 could be any other type of vehicle, or any other system having at least one sensor (e.g., a camera enabled smartphone). In the illustrated example, the memory 918 of the vehicle computing device 904 stores a localization component 920, a perception component 922, a planning component 924, one or more system controllers 926, one or more maps 928 a prediction component 930, a spatial monitoring component 932, and a tracker component 934. Though depicted in FIG. 9 as residing in the memory 918 for illustrative purposes, it is contemplated that the localization component 920, the perception component 922, the planning component 924, the one or more system controllers 926, the one or more maps 928, the prediction component 930, the spatial monitoring component 932, and/or the tracker component 934 can additionally, or alternatively, be accessible to the vehicle 902 (e.g., stored on, or otherwise accessible by, memory remote from the vehicle 902). In some instances, the vehicle computing device(s) 904 can correspond to or be an example of the vehicle computing device(s) 106 of FIG. 1.

In at least one example, the localization component 920 can include functionality to receive data from the sensor system(s) 906 to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the autonomous vehicle within the map. In some instances, the localization component 920 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 920 can provide data to various components of the vehicle 902 to determine an initial position of an autonomous vehicle for generating a trajectory and/or for determining to retrieve map data and/or a spatial grid from memory, as discussed herein.

In some instances, the perception component 922 can include functionality to perform object detection, segmentation, and/or classification. In some examples, the perception component 922 can provide processed sensor data that indicates a presence of an object that is proximate to the vehicle 902 and/or a classification of the object as an object type (e.g., car, pedestrian, cyclist, animal, building, tree, road surface, curb, sidewalk, unknown, etc.). In additional and/or alternative examples, the perception component 922 can provide processed sensor data that indicates one or more characteristics associated with a detected object (e.g., a tracked object) and/or the environment in which the object is positioned. In some examples, characteristics associated with the object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc. In some instances, the perception component 922 can operate in conjunction with the segmentation component 938 to segment image data, as discussed herein.

In general, the planning component 924 can determine a path for the vehicle 902 to follow to traverse through an environment. For example, the planning component 924 can determine various routes and trajectories and various levels of detail. For example, the planning component 924 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 924 can generate an instruction for guiding the autonomous vehicle along at least a portion of the route from the first location to the second location. In at least one example, the planning component 924 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 902 to navigate.

In some instances, the planning component 924 can generate one or more trajectories for the vehicle 902 based at least in part on states of one or more cells in a spatial grid, such as a radar spatial grid, as discussed herein. In some examples, the planning component 924 can use temporal logic, such as linear temporal logic and/or signal temporal logic, to evaluate one or more trajectories of the vehicle 902. Details of utilizing temporal logic in the planning component 924 are discussed in U.S. application Ser. No. 15/632, 147, which is herein incorporated by reference, in its entirety. As discussed above, in some examples, the spatial grid may include temporal logic symbols to assist the planner in evaluating one or more trajectories of the vehicle 902.

In at least one example, the vehicle computing device 904 can include one or more system controllers 926, which can be configured to control steering, propulsion, braking, safety, emitters, communication, and other systems of the vehicle 902. These system controller(s) 926 can communicate with and/or control corresponding systems of the drive module(s) 914 and/or other components of the vehicle 902.

The memory 918 can further include one or more maps 928 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 928 can include at least one map (e.g., images and/or a mesh). In some examples, the vehicle 902 can be controlled based at least in part on the maps 928. That is, the maps 928 can be used in connection with the localization component 920, the perception component 922, the planning component 924, and/or the spatial monitoring component 932 to determine a location of the vehicle 902, identify objects in an environment, and/or generate routes and/or trajectories to navigate within an environment.

In some examples, the one or more maps 928 can be stored on a remote computing device(s) (such as the computing device(s) 936) accessible via network(s) 938. In some examples, multiple maps 928 can be stored based on, for example, a characteristic (e.g., type of entity, time of day, day of week, season of the year, etc.). Storing multiple maps 928 can have similar memory requirements, but increase the speed at which data in a map can be accessed.

In some examples, the spatial monitoring component 932 and/or the maps 928 can store one or more spatial grids associated with individual locations in an environment. For example, as the vehicle 902 traverses the environment and as maps representing an area proximate to the vehicle 902 are loaded into memory, one or more spatial grids associated with a location can be loaded into memory as well.

In some examples, the prediction component 930 can include functionality to generate predicted trajectories of objects in an environment. For example, the prediction component 930 can generate one or more predicted trajectories for vehicles, pedestrians, animals, and the like within a threshold distance from the vehicle 902. In some instances, the prediction component 930 can measure a trace of an object and generate a trajectory for the object when the object enters an occlusion region in an environment. Thus, even in a case where an object is not visible to one or more sensors of the vehicle 902, the prediction component 930 can extend a trajectory of the object in memory so as to maintain data about the object even if the object is not captured in sensor data. Moreover, as discussed with reference to FIG. 6, the tracker 934 may be used to track objects in the occluded region based on radar returns, such as multi-path and/or multi-bounce returns.

In general, the spatial monitoring component 932 can include functionality to generate and/or maintain spatial grid data, determine occupied, occluded, and/or free space regions of an spatial grid, and to determine occupied, occluded, and/or free space states for cells of an spatial grid. In some instances, the spatial monitoring component 932 can correspond to the spatial monitoring component 108 of FIG. 1. As discussed herein, the spatial monitoring component 932 can receive radar data, lidar data, image data, map data, and the like to determine occupancy-related information in an environment. In some instances, the spatial monitoring component 932 can provide occupancy information to the planning component 924 to determine when to control the vehicle 902 to traverse an environment. Spatial monitoring component 932 can provide occupancy information to the prediction component 930 to generate predicted trajectories for one or more objects in an occluded region in an environment. Spatial monitoring component 932 can provide occupancy information to the tracker 934 to track dynamic objects in an occluded region in an environment.

As can be understood, the components discussed herein (e.g., the localization component 920, the perception component 922, the planning component 924, the one or more system controllers 926, the one or more maps 928, the prediction component 930, the spatial monitoring component 932, and the tracker 934) are described as divided for illustrative purposes. However, the operations performed by the various components can be combined or performed in any other component. By way of example, spatial monitoring functions may be performed by the perception component 922 (e.g., rather than the spatial monitoring component 932) to reduce the amount of data transferred by the system.

In some instances, aspects of some or all of the components discussed herein can include models, algorithms, and/or machine learning algorithms. For example, in some instances, the components in the memory 918 (and/or the memory 942, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 906 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the lidar sensors can include individual lidar sensors located at the corners, front, back, sides, and/or top of the vehicle 902. As another example, the camera sensors can include multiple cameras disposed at various locations about the exterior and/or interior of the vehicle 902. As another example, the radar system can include multiple instance of the same or different radar sensors disposed at various locations about the vehicle 902. The sensor system(s) 906 can provide input to the vehicle computing device 904. Additionally or alternatively, the sensor system(s) 906 can send sensor data, via the one or more networks 938, to the one or more computing device(s) at a particular frequency, after a lapse of a predetermined period of time, in near real-time, etc. In some instances, the sensor system(s) 906 can correspond to the sensor system(s) 104 of FIG. 1.

The vehicle 902 can also include one or more emitters 908 for emitting light and/or sound, as described above. The emitters 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive module(s) 914. Also, the communication connection(s) 910 can allow the vehicle to communicate with other nearby computing device(s) (e.g., other nearby vehicles, traffic signals, etc.). The communications connection(s) 910 also enable the vehicle 902 to communicate with a remote teleoperations computing device or other remote services.

The communications connection(s) 910 can include physical and/or logical interfaces for connecting the vehicle computing device 904 to another computing device or a network, such as network(s) 946. For example, the communications connection(s) 910 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 902 can include one or more drive modules 914. In some examples, the vehicle 902 can have a single drive module 914. In at least one example, if the vehicle 902 has multiple drive modules 914, individual drive modules 914 can be positioned on opposite ends of the vehicle 902 (e.g., the front and the rear, etc.). In at least one example, the drive module(s) 914 can include one or more sensor systems to detect conditions of the drive module(s) 914 and/or the surroundings of the vehicle 902. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders can be unique to the drive module(s) 914. In some cases, the sensor system(s) on the drive module(s) 914 can overlap or supplement corresponding systems of the vehicle 902 (e.g., sensor system(s) 906).

The drive module(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 914 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 914. Furthermore, the drive module(s) 914 also include one or more communication connection(s) that enable communication by the respective drive module with one or more other local or remote computing device(s).

In at least one example, the direct connection 912 can provide a physical interface to couple the one or more drive module(s) 914 with the body of the vehicle 902. For example, the direction connection 912 can allow the transfer of energy, fluids, air, data, etc. between the drive module(s) 914 and the vehicle. In some instances, the direct connection 912 can further releasably secure the drive module(s) 914 to the body of the vehicle 902.

In at least one example, the localization component 920, the perception component 922, the planning component 924, the one or more system controllers 926, the one or more maps 928, the prediction component 930, the spatial monitoring component 932, and/or the tracker 934 can process sensor data, as described above, and can send their respective outputs, over the one or more network(s) 938, to one or more computing device(s) 936. In at least one example, the localization component 920, the perception component 922, the planning component 924, the one or more system controllers 926, the one or more maps 928, the prediction component 930, the spatial monitoring component 932, and/or the tracker 934 can send their respective outputs to the one or more computing device(s) 936 at a particular frequency, after a lapse of a predetermined period of time, in near real-time, etc.

In some examples, the vehicle 902 can send sensor data to one or more computing device(s) 936 via the network(s) 938. In some examples, the vehicle 902 can send raw sensor data to the computing device(s) 936. In other examples, the vehicle 902 can send processed sensor data and/or representations of sensor data (e.g., spatial grid data) to the computing device(s) 936. In some examples, the vehicle 902 can send sensor data to the computing device(s) 936 at a particular frequency, after a lapse of a predetermined period of time, in near real-time, etc. In some cases, the vehicle 902 can send sensor data (raw or processed) to the computing device(s) 936 as one or more log files.

The computing device(s) 936 can include processor(s) 940 and memory 952 storing a map(s) component 944 and/or a spatial monitoring component 948.

In some instances, the map(s) component 944 can include functionality to associate spatial grid(s) with map locations. The spatial monitoring component 948 may perform substantially the same functions as those described for the spatial monitoring component 932 in addition to or instead of performing the functions at the vehicle computing device(s) 904. In some instances, a size of the spatial grid can be based at least in part on region characteristics such as a distance to an intersection or other map feature, a speed limit, a speed limit safety factor, and the like.

The processor(s) 916 of the vehicle 902 and the processor(s) 940 of the computing device(s) 936 can be any suitable processor capable of executing instructions to process data and perform operations as described herein. By way of example and not limitation, the processor(s) 916 and 940 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and 942 are examples of non-transitory computer-readable media. The memory 918 and 942 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 9 is illustrated as a distributed system, in alternative examples, components of the vehicle 902 can be associated with the computing device(s) 936 and/or components of the computing device(s) 936 can be associated with the vehicle 902. That is, the vehicle 902 can perform one or more of the functions associated with the computing device(s) 936, and vice versa. Further, aspects of the prediction component 930, the spatial monitoring component 932, and/or the tracker 934 can be performed on any of the devices discussed herein.

Example Clauses

A: An autonomous vehicle comprising: a radar system; one or more processors communicatively coupled to the radar system; and one or more computer-readable media storing instructions executable by the one or more processors, wherein the instructions, when executed, cause the autonomous vehicle to perform operations comprising: capturing, by the radar system, radar sensor data of an environment; detecting, based at least in part on the radar sensor data, an object in a first region of the environment; designating, based at least in part on detecting the object in the first region of the environment, a first cell of a spatial grid as being occupied, the first cell being associated with the first region of the environment; designating, based at least in part on a location of the first cell relative to a location of a radar sensor of the radar system, a second cell of the spatial grid as being occluded, the second cell being associated with a second region of the environment; designating, based at least in part on a field of view of the radar sensor, a third cell of the spatial grid as being free space, the third cell being associated with a region of the environment that is within the field of view of the radar sensor and is unoccupied and un-occluded; and controlling the autonomous vehicle within the environment based at least in part on the designations of the first cell, the second cell, and the third cell of the spatial grid.

B: The autonomous vehicle of example A, wherein: the radar sensor comprises a first radar sensor and the radar system comprises the first radar sensor and a second radar sensor, designating the first cell of the spatial grid as being occupied is based on radar sensor data of at least one of the first radar sensor or the second radar sensor indicating that the region corresponding to the first cell of the spatial grid is occupied, and designating the second cell of the spatial grid as being occluded by the object is based on radar sensor data of the first radar sensor and the second radar sensor indicating that the region corresponding to the second cell of the spatial grid is occluded.

C: The autonomous vehicle of any one of examples A or B, the operations further comprising: detecting, based at least in part on the radar sensor data, an object in the second region of the environment; and tracking the object in the second region, wherein controlling the autonomous vehicle in the environment is further based at least in part on the tracking of the object in the second region.

D: The autonomous vehicle of any one of examples A-C, the operations further comprising: determining that the object is a static object; computing an occupancy probability of a neighboring cell to the first cell of the spatial grid; and designating the neighboring cell to the first cell as being occupied by the static object based at least in part on the occupancy probability of the neighboring cell to the first cell being above a threshold probability.

E: The autonomous vehicle of any one of examples A-D, the operations further comprising: determining, based at least in part on the radar sensor data or other sensor data, a second region comprising a second cell; detecting, based at least in part on the radar sensor data, the object entering the second region; determining, based at least in part on the object entering the second region, that the second region is unoccupied; and updating the second cell of the spatial grid to indicate that the second region is unoccupied.

F: The autonomous vehicle of any one of examples A-C, the operations further comprising: determining that the object is a dynamic object; determining a bounding box associated with a track of the dynamic object; and designating one or more cells of the spatial grid associated with an area of the bounding box as being occupied.

G: The autonomous vehicle of any one of examples A-F, wherein: the spatial grid comprises a radar system spatial grid, and controlling the autonomous vehicle in the environment is further based at least in part on at least one of a lidar spatial grid or a camera spatial grid.

H: A method comprising: capturing, by a radar sensor, radar sensor data of an environment; designating, based at least in part on the radar data, a first cell of a spatial grid as being occupied, the first cell being associated with a first region of the environment; designating, based at least in part on a location of the first cell relative to a location of the radar sensor and relative to a second cell, the second cell as being occluded; and outputting the spatial grid associated with the environment.

I: The method of example H, wherein the radar sensor comprises a first radar sensor, and the method further comprises: capturing, by a second radar sensor, radar sensor data of an environment, wherein: designating the first cell of the spatial grid as being occupied is based on radar sensor data of at least one of the first radar sensor or the second radar sensor indicating that the region corresponding to the first cell of the spatial grid is occupied, and designating the second cell of the spatial grid as being occluded by the object is based on radar sensor data of the first radar sensor and the second radar sensor indicating that the region corresponding to the second cell of the spatial grid is occluded.

J: The method of any one of examples H or I, further comprising controlling an autonomous vehicle within the environment based at least in part on the spatial grid.

K: The method of any one of examples H-J, further comprising:
detecting, based at least in part on the radar sensor data, an object in the second region of the environment; and tracking the object in the second region, wherein controlling the autonomous vehicle in the environment is further based at least in part on the tracking of the object in the second region.

L: The method of any one of examples H-K, further comprising: computing an occupancy probability of a neighboring cell to the first cell of the spatial grid; and designating the neighboring cell to the first cell as being occupied based at least in part on the occupancy probability of the neighboring cell to the first cell being above a threshold probability.

M: The method of any one of examples H-L, further comprising: detecting, based at least in part on the radar sensor data, an object entering the first region, determining, based at least in part on the object entering the first region, that the first region is unoccupied; and updating the first cell of the spatial grid to indicate that the first region is unoccupied.

N: The method of any one of examples H-M, further comprising: determining that the occupied region is associated with a dynamic object; determining a bounding box associated with a track of the dynamic object; and designating one or more cells of the spatial grid associated with an area of the track of the bounding box as being occupied.

O: The method of any one of examples H-N, the method further comprising: fusing the occupancy grid with at least one of lidar data or camera data.

P: One or more non-transitory computer-readable media storing instructions that, when executed, cause one or more processors to perform operations comprising: capturing, by a radar sensor, radar sensor data of an environment; designating, based at least in part on radar sensor data associated with a first region of the environment, a first cell of a spatial grid as being occupied, the first cell being associated with the first region of the environment; designating, based at least in part on a location of the first cell relative to a location of the radar sensor, a second cell of the spatial grid as being occluded by the object, the second cell being associated with a second region of the environment; and outputting the spatial grid associated with the environment.

Q: The one or more non-transitory computer-readable media of example P, wherein the radar sensor comprises a first radar sensor and the operations further comprising: capturing, by a second radar sensor, radar sensor data of an environment, wherein: designating the first cell of the spatial grid as being occupied is based on radar sensor data of at least one of the first radar sensor or the second radar sensor indicating that the region corresponding to the first cell of the spatial grid is occupied, and designating the second cell of the spatial grid as being occluded by the object is based on radar sensor data of the first radar sensor and the second radar sensor indicating that the region corresponding to the second cell of the spatial grid is occluded.

R: The one or more non-transitory computer-readable media of any one of examples P or Q, the operations further comprising controlling an autonomous vehicle within the environment based at least in part on the spatial grid.

S: The one or more non-transitory computer-readable media of any one of examples P-R, the operations further comprising: detecting, based at least in part on the radar sensor data, an object in the second region of the environment; and tracking the object in the second region, wherein controlling the autonomous vehicle in the environment is further based at least in part on the tracking of the object in the second region.

T: The one or more non-transitory computer-readable media of any one of examples P-S, wherein the operations further comprise: fusing the spatial grid with at least one of lidar data or camera data.

While the example clauses described above are described with respect to one particular implementation, it should be understood that, in the context of this document, the content of the example clauses can also be implemented via a method, device, system, a computer-readable medium, and/or another implementation.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
a radar system;
one or more processors communicatively coupled to the radar system; and
one or more computer-readable media storing instructions executable by the one or more processors, wherein the instructions, when executed, cause the autonomous vehicle to perform operations comprising:
capturing, by the radar system, radar sensor data of an environment;
detecting, based at least in part on the radar sensor data, an object in a first region of the environment;
determining the object to be a static object or a dynamic object;
designating, based on detecting the object in the first region of the environment, a first cell of a spatial grid as being occupied, the first cell being associated with the first region of the environment;
computing, based at least in part on the object being static or dynamic, an occupancy probability of a neighboring cell to the first cell of the spatial grid and designating the neighboring cell to the first cell as being occupied based on the occupancy probability being above a threshold probability;
designating, based on a location of at least one of the first cell or the neighboring cell designated as occupied relative to a location of a radar sensor of the radar system, a second cell of the spatial grid as being occluded, the second cell being associated with a second region of the environment;
designating, based at least in part on a field of view of the radar sensor, a third cell of the spatial grid as being free space, the third cell being associated with a region of the environment that is within the field of view of the radar sensor and is unoccupied and un-occluded; and
controlling the autonomous vehicle within the environment based at least in part on the designations of the first cell, the neighboring cell, the second cell, and the third cell of the spatial grid.

2. The autonomous vehicle of claim 1, wherein:
the radar sensor comprises a first radar sensor and the radar system comprises the first radar sensor and a second radar sensor,
designating the first cell of the spatial grid as being occupied is based on radar sensor data of at least one of the first radar sensor or the second radar sensor indicating that the region corresponding to the first cell of the spatial grid is occupied, and
designating the second cell of the spatial grid as being occluded by the object is based on radar sensor data of the first radar sensor and the second radar sensor indicating that the region corresponding to the second cell of the spatial grid is occluded.

3. The autonomous vehicle of claim 1, the operations further comprising:
detecting, based at least in part on the radar sensor data, an object in the second region of the environment; and
tracking the object in the second region,
wherein controlling the autonomous vehicle in the environment is further based at least in part on the tracking of the object in the second region.

4. The autonomous vehicle of claim 1, wherein the operations further comprise:
determining that the object is a static object; and
designating the neighboring cell to the first cell as being occupied by the static object.

5. The autonomous vehicle of claim 1, the operations further comprising:
determining, based at least in part on the radar sensor data or other sensor data, a third region comprising a fourth cell;
detecting, based at least in part on the radar sensor data, the object entering the third region;
determining, based at least in part on the object entering the third region, that the third region is unoccupied; and
updating the fourth cell of the spatial grid to indicate that the third region is unoccupied.

6. The autonomous vehicle of claim 1, the operations further comprising:
determining that the object is a dynamic object;
determining a bounding box associated with a track of the dynamic object; and
designating one or more cells of the spatial grid associated with an area of the bounding box as being occupied.

7. The autonomous vehicle of claim 1, wherein:
the spatial grid comprises a radar system spatial grid, and
controlling the autonomous vehicle in the environment is further based at least in part on at least one of a lidar spatial grid or a camera spatial grid.

8. A method comprising:
capturing, by a radar sensor, radar sensor data of an environment;
detecting, based at least in part on the radar sensor data, an object in a first region of the environment;
determining the object to be a static object or a dynamic object;
designating, based on the radar data, a first cell of a spatial grid as being occupied, the first cell being associated with a first region of the environment;
computing, based at least in part on the object being static or dynamic, an occupancy probability of a neighboring cell to the first cell of the spatial grid and designating the neighboring cell to the first cell as being occupied based on the occupancy probability being above a threshold probability;
designating, based on a location of at least one of the first cell or the neighboring cell designated as occupied relative to a location of the radar sensor and relative to a second cell, the second cell as being occluded; and
outputting the spatial grid associated with the environment.

9. The method of claim 8, wherein the radar sensor comprises a first radar sensor, and the method further comprises:

capturing, by a second radar sensor, radar sensor data of an environment, wherein:
designating the first cell of the spatial grid as being occupied is based on radar sensor data of at least one of the first radar sensor or the second radar sensor indicating that the region corresponding to the first cell of the spatial grid is occupied, and
designating the second cell of the spatial grid as being occluded by the object is based on radar sensor data of the first radar sensor and the second radar sensor indicating that the region corresponding to the second cell of the spatial grid is occluded.

10. The method of claim 8, further comprising controlling an autonomous vehicle within the environment based at least in part on the spatial grid.

11. The method of claim 10, further comprising:
detecting, based at least in part on the radar sensor data, an object in the second region of the environment; and
tracking the object in the second region,
wherein controlling the autonomous vehicle in the environment is further based at least in part on the tracking of the object in the second region.

12. The method of claim 8, further comprising:
detecting, based at least in part on the radar sensor data, another object entering the first region,
determining, based at least in part on the another object entering the first region, that the first region is unoccupied; and
updating the first cell of the spatial grid to indicate that the first region is unoccupied.

13. The method of claim 8, further comprising:
determining that the occupied region is associated with a dynamic object;
determining a bounding box associated with a track of the dynamic object; and
designating one or more cells of the spatial grid associated with an area of the track of the bounding box as being occupied.

14. The method of claim 8, the method further comprising:
fusing the occupancy grid with at least one of lidar data or camera data.

15. One or more non-transitory computer-readable media storing instructions that, when executed, cause one or more processors to perform operations comprising:
capturing, by a radar sensor, radar sensor data of an environment;
detecting, based at least in part on the radar sensor data, an object in the first region of the environment;
determining that the object is a static object or a dynamic object;
designating, based on radar sensor data associated with a first region of the environment, a first cell of a spatial grid as being occupied, the first cell being associated with the first region of the environment;
computing, based at least in part on determining that the object is a static object or a dynamic object, an occupancy probability of a neighboring cell to the first cell of the spatial grid and designating the neighboring cell to the first cell as being occupied by the static object or dynamic object based at least in part on the occupancy probability of the neighboring cell to the first cell being above a threshold probability;
designating, based on a location of at least one of the first cell or the neighboring cell designated as occupied relative to a location of the radar sensor, a second cell of the spatial grid as being occluded, the second cell being associated with a second region of the environment; and
outputting the spatial grid associated with the environment.

16. The one or more non-transitory computer-readable media of claim 15, wherein the radar sensor comprises a first radar sensor and the operations further comprising:
capturing, by a second radar sensor, radar sensor data of an environment, wherein:
designating the first cell of the spatial grid as being occupied is based on radar sensor data of at least one of the first radar sensor or the second radar sensor indicating that the region corresponding to the first cell of the spatial grid is occupied, and
designating the second cell of the spatial grid as being occluded is based on radar sensor data of the first radar sensor and the second radar sensor indicating that the region corresponding to the second cell of the spatial grid is occluded.

17. The one or more non-transitory computer-readable media of claim 15, the operations further comprising controlling an autonomous vehicle within the environment based at least in part on the spatial grid.

18. The one or more non-transitory computer-readable media of claim 17, the operations further comprising:
detecting, based at least in part on the radar sensor data, an object in the second region of the environment; and
tracking the object in the second region,
wherein controlling the autonomous vehicle in the environment is further based at least in part on the tracking of the object in the second region.

19. The one or more non-transitory computer-readable media of claim 15, wherein the operations further comprise:
fusing the spatial grid with at least one of lidar data or camera data.

20. The autonomous vehicle of claim 15, wherein the operations further comprise:
determining that the object is a static object; and
designating the neighboring cell to the first cell as being occupied by the static object.

* * * * *